US007260483B2

(12) United States Patent
Gard et al.

(10) Patent No.: US 7,260,483 B2
(45) Date of Patent: Aug. 21, 2007

(54) REAL-TIME DETECTION METHOD AND SYSTEM FOR IDENTIFYING INDIVIDUAL AEROSOL PARTICLES

(75) Inventors: Eric E. Gard, San Francisco, CA (US); Keith R. Coffee, Patterson, CA (US); Matthias Frank, Oakland, CA (US); Herbert J. Tobias, Kensington, CA (US); David P. Fergenson, Alamo, CA (US); Norm Madden, Livermore, CA (US); Vincent J. Riot, Berkeley, CA (US); Paul T. Steele, Livermore, CA (US); Bruce W. Woods, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/916,737

(22) Filed: Aug. 11, 2004

(65) Prior Publication Data

US 2005/0073683 A1 Apr. 7, 2005

Related U.S. Application Data

(63) Continuation-in-part of application No. 10/280,608, filed on Oct. 24, 2002, now Pat. No. 6,959,248.

(60) Provisional application No. 60/494,442, filed on Aug. 11, 2003, provisional application No. 60/335,598, filed on Oct. 25, 2001.

(51) Int. Cl.
*G01N 31/00* (2006.01)
*B01D 59/44* (2006.01)

(52) U.S. Cl. ............................ 702/22; 702/24; 702/30; 250/285; 250/287

(58) Field of Classification Search ..................... None
See application file for complete search history.

(56) References Cited

U.S. PATENT DOCUMENTS 3,763,428 A * 10/1973 Preist ........................ 324/71.1

(Continued)

FOREIGN PATENT DOCUMENTS

WO WO 00/63673 10/2000

(Continued)

OTHER PUBLICATIONS

Gard, E. et al. "Real-time Analysis of Individual Atmospheric Aerosol Particles: Design and Performance of a Portable ATOFMS", Analytical Chemistry, American Chemcial Society. vol. 69, No. 20. Oct. 15, 1997, pp. 4083-4091.*

(Continued)

*Primary Examiner*—Manuel L. Barbee
(74) *Attorney, Agent, or Firm*—James S. Tak; John H. Lee

(57) ABSTRACT

An improved method and system of identifying individual aerosol particles in real time. Sample aerosol particles are collimated, tracked, and screened to determine which ones qualify for mass spectrometric analysis based on predetermined qualification or selection criteria. Screening techniques include one or more of determining particle size, shape, symmetry, and fluorescence. Only qualifying particles passing all screening criteria are subject to desorption/ionization and single particle mass spectrometry to produce corresponding test spectra, which is used to determine the identities of each of the qualifying aerosol particles by comparing the test spectra against predetermined spectra for known particle types. In this manner, activation cycling of a particle ablation laser of a single particle mass spectrometer is reduced.

47 Claims, 18 Drawing Sheets

U.S. PATENT DOCUMENTS

| | | | | | |
|---|---|---|---|---|---|
| 4,606,636 | A | * | 8/1986 | Monin et al. | 356/338 |
| 4,710,025 | A | | 12/1987 | Wyatt et al. | |
| 5,089,714 | A | * | 2/1992 | Ludlow et al. | 250/574 |
| 5,681,752 | A | * | 10/1997 | Prather | 436/173 |
| 5,701,012 | A | | 12/1997 | Ho | |
| 5,788,741 | A | * | 8/1998 | Burton et al. | 95/32 |
| 5,826,214 | A | * | 10/1998 | Lieb et al. | 702/24 |
| 5,895,922 | A | | 4/1999 | Ho | |
| 5,998,215 | A | | 12/1999 | Prather et al. | |
| 5,999,250 | A | | 12/1999 | Hairston et al. | |
| 2002/0109084 | A1 | * | 8/2002 | Ellson et al. | 250/288 |
| 2002/0138210 | A1 | * | 9/2002 | Wilkes et al. | 702/28 |

FOREIGN PATENT DOCUMENTS

WO WO 02052246 A2 * 7/2002

OTHER PUBLICATIONS

Trimborn, A. et al. "online Analysis of Atmospheric particles with a Transportable Laser Mass Spectrometer", Aerosol Science and Technology 33:191-201 (2000).*

* cited by examiner

REAL-TIME DETECTION METHOD AND SYSTEM FOR IDENTIFYING INDIVIDUAL AEROSOL PARTICLES

I. CLAIM IN CO-PENDING APPLICATIONS

This application is a continuation-in-part of U.S. application Ser. No. 10/280,608 filed Oct. 24, 2002, now U.S. Pat. No. 6,959,248, entitled "Real-Time Detection Method and System for Identifying Individual Aerosol Particles", which claims the benefit of U.S. Provisional Application No. 60/335,598 filed Oct. 25, 2001, entitled "General Aerosol Rapid Detection System," both of which are hereby incorporated by reference. Additionally, this application claims the benefit of priority in provisional application filed on Aug. 11, 2003 entitled "Biological Aerosol Mass Spectrometry System" Ser. No. 60/494,442, also hereby incorporated by reference.

The United States Government has rights in this invention pursuant to Contract No. W-7405-ENG48 between the United States Department of Energy and the University of California for the operation of Lawrence Livermore National Laboratory.

II. FIELD OF THE INVENTION

The present invention relates to particle detection systems and methods of analysis. The invention relates more particularly to a rapid detection method and system for efficiently determining the identity in real time of individual aerosol particles, such as biological aerosol particles (hereinafter "bio-aerosol particles", by screening the aerosol particles based on predetermined selection/qualification criteria and performing detailed mass spectrometric analysis on only those qualifying aerosol particles satisfying the predetermined qualification criteria. In this manner, ablation laser cycling of the mass spectrometer may be reduced so as to overcome the speed/cycling limitation thereof.

III. BACKGROUND OF THE INVENTION

The potential threat of biological and chemical agent warfare is an ever-increasing national security concern. Of the known biological and chemical warfare agents it has been suggested that those capable of being deployed as aerosols are of greatest concern due to their ease and speed of dissemination over wide areas in lethal concentrations. All six of the Category A bioterrorism agents listed by the Centers for Diseases Control and Prevention are capable of being transmitted as bio-aerosols, including *Bacillus anthracis*, more commonly known as "anthrax." The detection of such biological and chemical weapons attacks, however, is inherently difficult due to the small sample sizes involved. For example, a lethal dose of *Bacillus anthracis* spores weighs only 4 ng. In addition, these small samples can be widely dispersed within the air and may be found mixed with many other aerosol particles present in concentrations thousands of times larger than the bio-aerosol particle of interest. These demanding sampling conditions and other detection issues such as the unreliability of real time particle source analysis and identification have been problematic for the rapid and specific screening of packages, letters, baggage, passengers, and shipping containers for biological and/or chemical agents.

Various methods, including standard microbiology, molecular, and mass spectroscopy based approaches have been and are currently employed to characterize aerosol particles, including the detection of bio-aerosol particles and chemical agent aerosol particles. While such methodologies are often capable of providing species level detection of bio-aerosol particles, they are, however, typically achieved at the expense of long analysis times ranging from hours to days, when sample collection, preparation, and actual analysis/identification are all considered. For example, traditional microbiological methods such as culturing are time-consuming, labor-intensive, and also detect only live cells. Molecular based methods, such as the Polymerase Chain Reaction (PCR), in-situ hybridization, and immunoassays, are extremely sensitive and specific at the species level which identify the presence of harmful bio-aerosol particles, but also require time-consuming sample collection, specialized reagents, and processing prior to analysis. And mass spectrometry is well suited to the detection of biological agents due to its high information content and its inherent sensitivity to extremely small samples. However, current mass spectrometry approaches also suffer from relatively long analysis times due to the required sample collection, culturing, preparation, and analysis. In all of these methods, offline operation precludes true real-time analysis and onsite identification of particle source, including threat agents, and may present too substantial a disruption of commerce to be used as a pragmatic alternative. In fact, many "online" and "real time" particle detection and analysis systems simply provide sorting of spectral data into similar groups (e.g. via fuzzy logic algorithms) for subsequent visual identification by an expert user. They also typically consume large amounts of expensive consumables and are also incapable of determining the concentration of the biologics and therefore cannot determine if an infectious dose was encountered.

In the alternative, spectroscopic techniques, such as laser induced fluorescence are used for the instantaneous optical analysis of bio-aerosol particles. Unfortunately, while such techniques are reagentless and operate autonomously at high rep rates, the resulting fluorescence spectra suffers from a lack of specificity for biologics, i.e. contains too little information to differentiate some environmental particles from the organisms of interest. Consequently they have unacceptably high false alarm probabilities ($P_{fa}$), such as from soot and dust, and are incapable of identifying harmless biological aerosol particles from harmful ones (i.e. species-level differences between single cells). The lack of specificity for biological aerosols is due to the limited mass range (less than 600 daltons) and inhomogeneity in the desorption/ ionization laser.

To address these challenges and concerns, aerosol mass spectrometry systems, such as aerosol time of flight mass spectrometers (ATOFMS) of the type shown in U.S. Pat. No. 5,998,215 to Prather et al, have been developed to perform rapid single particle analysis by instantaneous mass spectrometric characterization of aerosol particles without using reagents or requiring sample preparation. While such systems provide relatively rapid analysis of particles in flight, they are however limited to applications in environments with, for example, less than $10^2$ particles per liter of air of background particles. This is due to inherent inefficiencies in the system limiting the analysis rate to approximately two particles per second (e.g. activation cycling of ablation laser for mass spectrometry). Consequently, this speed limitation makes the use of conventional ATOFMS systems difficult for rapid, real-time detection and specific identity determination of biological aerosol particles, since small samples of bio-aerosol particles are often widely dispersed and mixed within mediums, such as air, containing large concentrations of background particles (e.g. $10^6$ particles per liter of air).

This is especially true in polluted environments such as urban and industrial settings as well as battlefield conditions. Such systems would thus be applicable for the rapid, real-time detection of bio-aerosol particles and chemical agent aerosols in relatively pristine environments only.

There is therefore a need for a real time particle detection system providing rapid or virtually instantaneous identification of a single aerosol particle from among known particle types or sources, and which goes beyond a simple determination of a particle's chemical composition from mass spectra. In addition, there is also a need for a system which addresses the need for both rapid and specific determination of biological and chemical warfare agents in sampling mediums, such as air, containing large concentrations of background particles. To this end, the ability to rapidly detect, screen, and target for mass spectrometric analysis only selected/qualifying biological and chemical aerosol particles within a complex mixture of background particles would aid in the detection and interdiction of bioterrorist attack in real and often heavily polluted environments.

IV. SUMMARY OF THE INVENTION

One aspect of the present invention includes a method of identifying individual aerosol particles in real time comprising: receiving sample aerosol particles; producing positive and negative test spectra of an individual aerosol particle using a bipolar single particle mass spectrometer; comparing each test spectrum to spectra of the same respective polarity in a database of predetermined positive and negative spectra for known particle types to obtain a set of substantially matching spectra; and determining the identity of the individual aerosol particle from the set of substantially matching spectra by determining a best matching one of the known particle types having both a substantially matching positive spectrum and a substantially matching negative spectrum associated therewith from the set.

Another aspect of the present invention includes a method of detecting in real time chemical and/or biological threat agents from a test specimen comprising: placing the test specimen in an enclosure defining a sampling volume; collecting sample aerosol particles from the sampling volume; receiving the sample aerosol particles into a bipolar single particle mass spectrometer; producing positive and negative test spectra of an individual aerosol particle using the bipolar single particle mass spectrometer; comparing each test spectrum to spectra of the same respective polarity in a database of predetermined positive and negative spectra for known particle types including threat agents, to produce a similarity score for each predetermined spectrum and obtain a set of substantially matching spectra based on a predetermined vigilance factor for similarity scores; determining the identity of the individual aerosol particle from the set of substantially matching spectra by determining a best matching one of the known particle types having both a substantially matching positive spectrum and a substantially matching negative spectrum associated therewith from the set, with at least one of the substantially matching positive and negative spectra having the highest order similarity score of all substantially matching spectra of the same respective polarity; and notifying a user upon identifying the individual aerosol particle as a threat agent from the known particle types.

And still another aspect of the present invention includes a system for identifying individual aerosol particles in real time comprising: a bipolar single particle mass spectrometer adapted to receive sample aerosol particles and produce positive and negative test spectra of individual aerosol particles; a data storage medium; a database of predetermined positive and negative spectra for known particle types stored on the data storage medium; and a data processor having a first data processing module adapted to compare each test spectra to spectra of the same respective polarity in the database to obtain a set of substantially matching spectra, and a second data processing module adapted to determine the identity of the individual aerosol particle from the set of substantially matching spectra by determining a best matching one of the known particle types having both a substantially matching positive spectrum and a substantially matching negative spectrum associated therewith from the set.

Another aspect of the present invention includes a method of identifying individual aerosol particles comprising: collimating sample aerosol particles into a particle beam; tracking the collimated particles of the particle beam; screening the tracked particles to determine which ones qualify for mass spectrometric analysis by satisfying predetermined qualification criteria; desorbing/ionizing the qualifying particles to produce at least one test spectrum for each qualifying particle; and determining the identity of each desorbed/ionized particle by comparing the corresponding test spectrum to predetermined spectra for known particle types.

Another aspect of the present invention includes a method of identifying individual aerosol particles comprising: pre-concentrating a predetermined particle size range of sample aerosol particles; collimating the pre-concentrated particles into a particle beam by at least one of aerodynamically focusing and acoustically focusing the particles toward a central axis of the particle beam; tracking the collimated particles using an optic detector comprising at least two photo-sensors serially arranged along a flow path of the particle beam and capable of optically detecting particles passing thereby, said optical detector adapted to determine particle velocities from the time of flight between the photo-sensors and particle trajectories from the differences in detection response times between the photo-sensors; screening the tracked particles to determine which ones qualify for mass spectrometric analysis by satisfying predetermined qualification criteria, said screening comprising at least one of: determining the size of an individual particle, with the qualification criteria including having a particle size within a predetermined particle size range; determining the symmetry of an individual particle, with the qualification criteria including having a predetermined particle symmetry or asymmetry; determining the shape of an individual particle, with the qualification criteria including having a predetermined particle shape; and determining whether an individual particle is a biological particle, with the qualification criteria including exhibiting fluorescence when exposed to radiation in a predetermined wavelength range; desorbing/ionizing the qualifying particles to produce at least one test spectrum for each qualifying particle; and determining the identity of each desorbed/ionized particle by comparing the corresponding test spectrum to predetermined spectra for known particle types.

Another aspect of the present invention includes, in a method for identifying aerosol particles by single particle mass spectrometry employing a particle ablation laser, the improvement comprising: screening a collimated flow of sample aerosol particles to determine which ones qualify for single particle mass spectrometric analysis by satisfying predetermined qualification criteria; and activating the particle ablation laser to desorb/ionize an individual aerosol particle upon a determination that the particle has satisfied the qualification criteria, whereby the activation cycling of the laser is reduced.

Another aspect of the present invention includes a method of screening individual aerosol particles to determine which ones qualify for single particle mass spectrometric analysis, comprising: at least one of: determining the size of an individual particle, determining the symmetry of an individual particle, determining the shape of an individual particle, and determining whether the individual particle is a biological particle; and selecting for single particle mass spectrometric analysis those individual particles satisfying predetermined qualification criteria associated with corresponding ones of said determinations.

Another aspect of the present invention includes a system for determining the identities of individual aerosol particles comprising: a collimating module adapted to produce a particle beam from sample aerosol particles; a particle tracking module adapted to track the collimated particles of the particle beam; screening means for determining which ones of the tracked particles qualify for mass spectrometric analysis by satisfying predetermined qualification criteria; a single particle mass spectrometer having an ablation laser for desorbing/ionizing the qualifying particles to produce at least one test spectrum for each qualifying particle; and analyzing means for determining the identity of each desorbed/ionized particle by comparing the corresponding test spectrum to predetermined spectra for known particle types.

Another aspect of the present invention includes a system for identifying individual aerosol particles comprising: a particle concentrator module for pre-concentrating a predetermined particle size range of sample aerosol particles; a collimating module having at least one of an aerodynamic focusing component and an acoustic focusing component, for producing a collimated particle beam from sample aerosol particles by focusing the particles toward a central axis of the particle beam; a particle tracking module having an optic detector comprising at least two photo-sensors serially arranged along a flow path of the particle beam and capable of optically detecting particles passing thereby, said optical detector adapted to determine particle velocities from the time of flight between the photo-sensors and particle trajectories from the differences in detection response times between the photo-sensors; screening means for determining which ones of the tracked particles qualify for mass spectrometric analysis by satisfying predetermined qualification criteria, the screening means comprising at least one of: means for determining the size of an individual particle, with the qualification criteria including having a particle size within a predetermined particle size range; means for determining the symmetry of an individual particle, with the qualification criteria including having a predetermined particle symmetry or asymmetry; means for determining the shape of an individual particle, with the qualification criteria including having a predetermined particle shape; and means for determining whether an individual particle is a biological particle, with the qualification criteria including exhibiting fluorescence when exposed to radiation in a predetermined wavelength range; a single particle mass spectrometer having an ablation laser for desorbing/ionizing the qualifying particles to produce at least one test spectrum for each qualifying particle; and analyzing means for determining the identity of each desorbed/ionized particle by comparing the corresponding test spectrum to predetermined spectra for known particle types.

Another aspect of the present invention includes, in a single particle mass spectrometer employing a particle ablation laser to desorb/ionize individual particles in a collimated particle flow of sample aerosol particles, the improvement comprising: screening means for determining which ones of the sample aerosol particles qualify for single particle mass spectrometric analysis by satisfying predetermined qualification criteria, said screening means operably connected to the particle ablation laser to activate the particle ablation laser, upon a determination that a particle has satisfied the predetermined qualification criteria, so as to desorb/ionize the qualifying particle for single particle mass spectrometric analysis, whereby the activation cycling of the particle ablation laser is reduced.

V. BRIEF DESCRIPTION OF THE DRAWINGS

The accompanying drawings, which are incorporated into and form a part of the disclosure, are as follows.

VI. DETAILED DESCRIPTION

The present invention is a general aerosol rapid detection (GARD) system and method which interrogates individual aerosol particles in an effort to characterize a sample that might be of interest either scientifically, medically, commercially, or as an indication of a terrorist threat, or in the interest of law enforcement. In particular, the system and method of the present invention serves to achieve more than a simple determination of a particle's chemical composition or further grouping into similar clusters. Instead, the system operates to analyze and positively identify an individual aerosol particle (not in aggregate) of unknown origin from a database of known particle types, with each known particle type associated with both a positive spectrum profile and a negative spectrum profile. Furthermore, the analysis and identification is achieved online and in real time, with the identification results rapidly communicated to a user in a virtually instantaneous manner.

In this manner, the system may be used to characterize and identify particular substances, such as bioterrorist agents and their surrogates, surrogates of plant, animal and human disease-causing microorganisms, cells in various stages of their life cycles, microorganism growth media, illegal drugs and samples likely to be confused with other threat agents by the casual observer. It is appreciated that the present invention may also be used to characterize and identify samples containing explosives or to monitor an industrial process for a detrimental byproduct. And other applications may include the monitoring of open air for threat agents, the rapid diagnosis of transmissible disease, the rapid and noninvasive detection of explosives, drugs or biological threat agents in packages, envelopes or shipping containers, the rapid biopsy of individual cells for medical diagnoses, real-time building monitoring, and the scientific investigation of single cells and their responses to drugs or other stimuli in cultures, among others.

Figure 1:
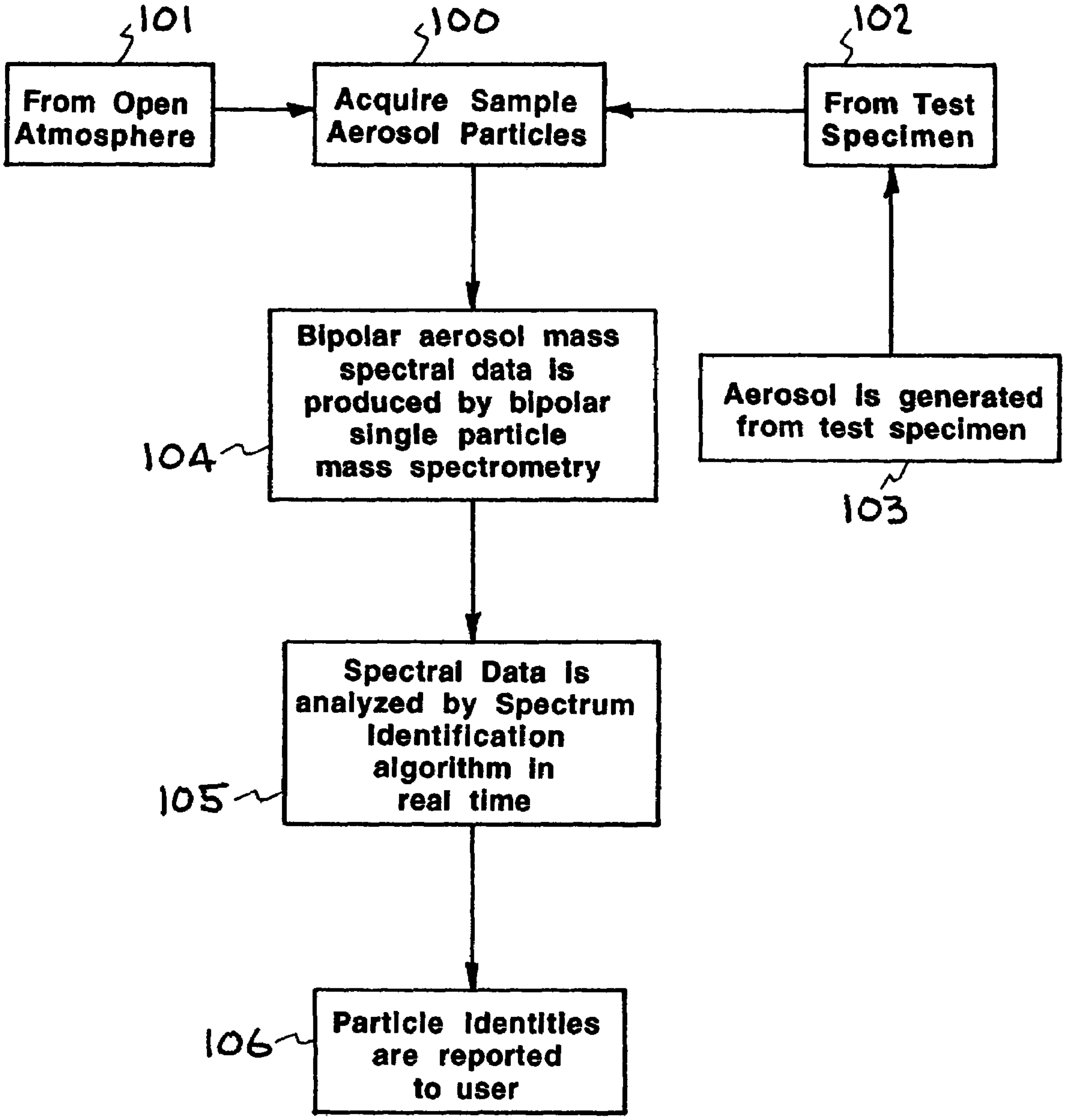
FIG. 1 is an overview flow chart illustrating an exemplary embodiment of the detection method of the present invention.

Turning now to the drawings, FIG. 1 shows an overview flow chart of the various stages of operation of an exemplary embodiment of the detection system and method in accordance with the present invention. The detection method begins at block 100 by collecting or otherwise acquiring sample aerosol particles to be identified. This may be accomplished, for example, using a collection hose or other conduit and a vacuum source (not shown) which together serve to draw the aerosol particles into a mass spectrometer for spectral analysis. It is appreciated that the vacuum source may originate from the mass spectrometer itself or from an external source. In any case, the sample aerosol particles may be acquired from the open atmosphere, as shown at block 101, for open air monitoring applications, or for sampling a volume of space in general, such as a room or an enclosure.

Alternatively, at block 102, sample aerosol particles may also be obtained from a test specimen or other object under inspection (not shown), such as a letter, potentially laden with a threat agent or other target particle type. In contrast to open air monitoring where the particles are already in the aerosol phase, particles must be resuspended from the test specimen for sampling. In this regard, the system may also include an aerosol generator serving to aerosolize particles found on the test specimen. The aerosol generator may operate by blowing compressed air on or in the test specimen to aerosolize and reentrain the particles either from the surface or from within the test specimen. Or aerosol generation may involve the deliberate nebulization of the sample by means of a collision nebulizer or bubble aerosol generator. Alternatively, the aerosol generator may operate by agitating the test specimen, such as by direct manipulation, and then sampling the headspace for aerosol particles that have been resuspended. In any case, once the particles are aerosolized by the aerosol generator, a suitable sample collection apparatus, such as the hose and vacuum arrangement described above, may be utilized for sample collection from the test specimen. It is notable that the test specimen may be first placed within a sampling enclosure serving to restrict generated aerosol particles to within the enclosed sampling volume. And a "test specimen" may be any physical object or sample which is the subject of inspection and testing, including, but not limited to, letters, parcels, containers, baggage, and even people, e.g. airline passengers.

Figure 6:
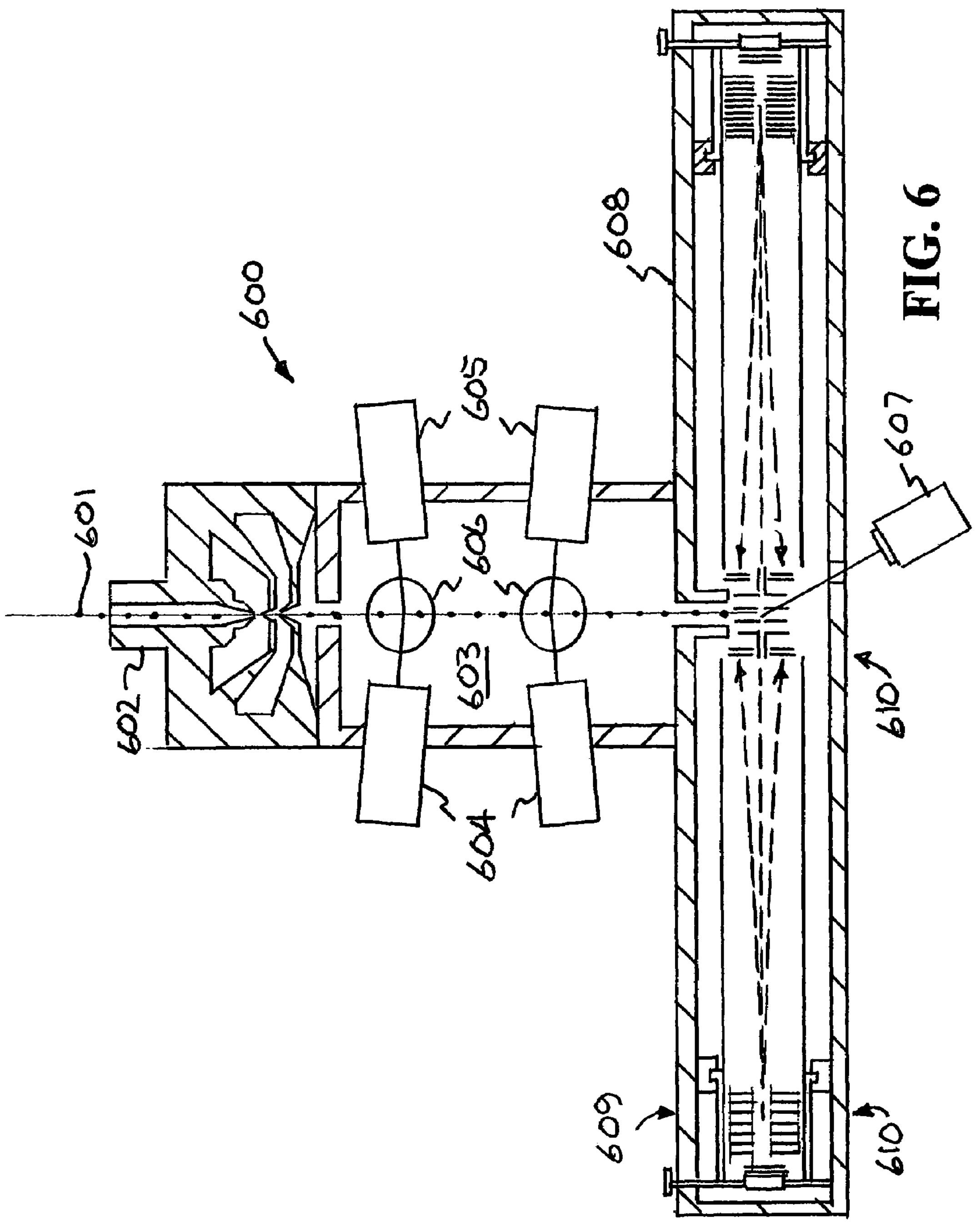
FIG. 6 (PRIOR ART)
FIG. 6 is a schematic view of an exemplary prior art aerosol time of flight mass spectrometer which may be utilized in the present invention.

Next, at block 104, the acquired sample aerosol particles are transmitted to a bipolar single particle mass spectrometer for spectral analysis, such as an aerosol time-of-flight mass spectrometer (ATOFMS) shown in FIG. 6. FIG. 6 shows an exemplary bipolar ATOFMS, generally indicated at reference character 600, of a type disclosed in U.S. Pat. No. 5,998,215 to Prather et. al incorporated by reference herein. While this ATOFMS is but one type of bipolar single particle mass spectrometer usable in the present invention, the Prather ATOFMS will be referenced hereinafter as a representative bipolar single particle mass spectrometer. As can be seen in FIG. 6, individual aerosol particles 601 enter the ATOFMS though an aerosol inlet port 602 and are supersonically expanded through a nozzle to differentiate the velocities of different sized particles. The individual particles are then passed through a particle sizing region 603 where the aerodynamic diameter of the particles are determined by the size-dependent velocity distribution. This is accomplished by using a pair of lasers 604, such as a continuous-wave argon ion laser beam, from which a passing particle generates a pulse of scattered light. The scattered light is collected by a corresponding one of a pair of photomultiplier tubes 605 (PMT) using elliptical mirrors 606. Particle velocity is determined from the predetermined distance between the two laser beams and the measured time between the two scatter pulses. In this manner, a timing circuit (not shown) tracks an individual particle and controls the firing of a desorption/ionization laser, such as a Nd:Yag laser 607, to generate positive and negative ions at a source region of a laser desorption/ionization time-of-flight mass spectrometer 608. The mass spectrometer 608 has two reflectron-fitted flight tubes 609 capable of processing positive and negative ions. Annular detectors, such as MSP detectors 610, are utilized for detecting the reflected ions and provides a time spectrum of each of the particles to produce both positive and negative mass-to-charge spectra. In this manner, bipolar aerosol mass spectral data is produced by bipolar single particle mass spectrometry at block 104 of FIG. 1.

Figure 2:
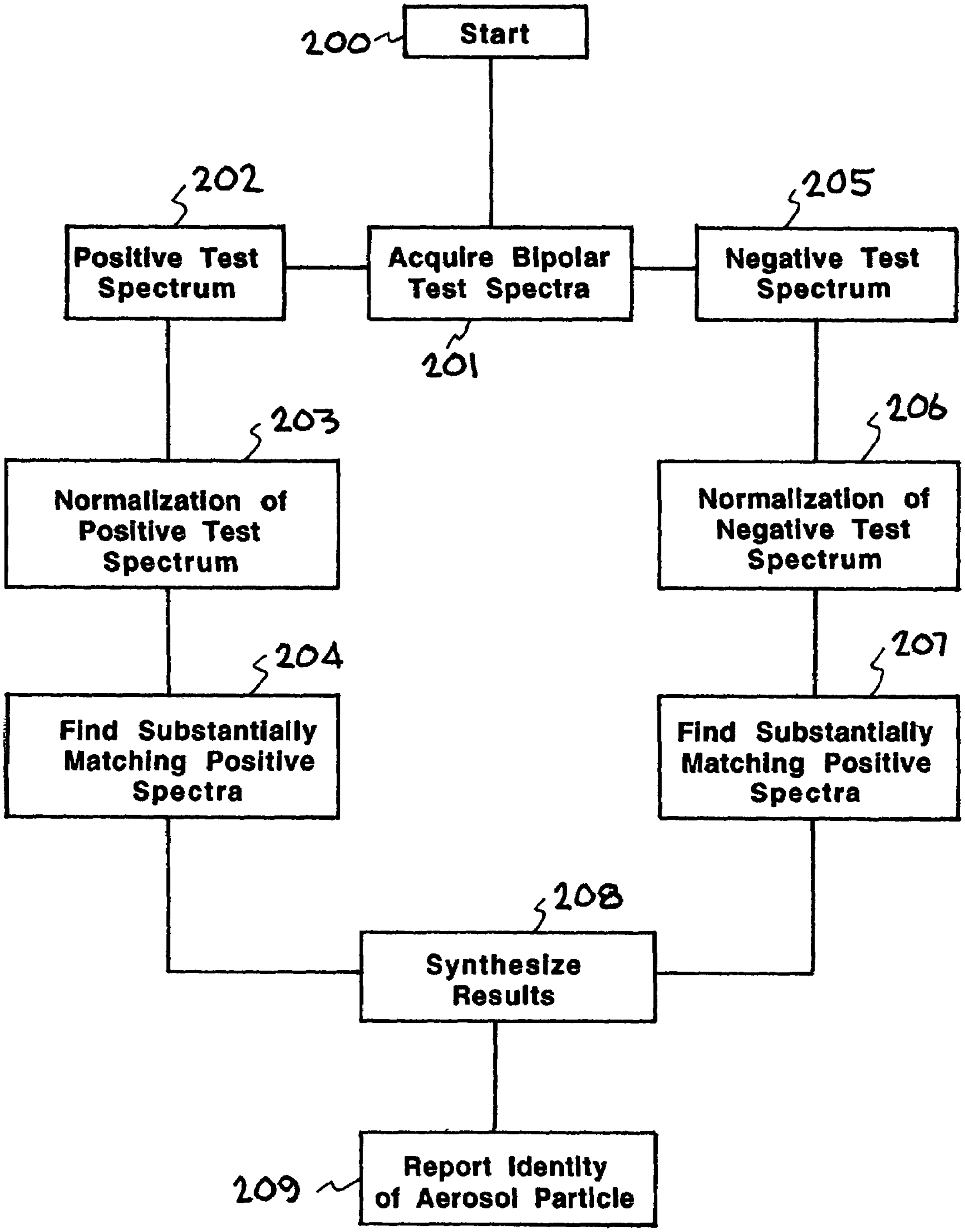
FIG. 2 is an overview flow chart of the spectral identification algorithm.

At block 105 of FIG. 1, the bipolar spectral data produced and acquired by the ATOFMS is analyzed in real time by a data processing system, such as a computer processor, in a spectrum identification algorithm (hereinafter "algorithm") shown in detail in FIGS. 2–5. It is notable that the data processing system need not be in local proximity to the ATOFMS, with spectral data being transmitted to the data processing system via intranet or Internet. FIG. 2 shows an overview flow chart of the steps in the algorithm starting at box 200. Generally the algorithm acquires test spectra at 201 for both positive and negative polarities. The positive test spectrum is analyzed starting at 202, while the negative test spectrum is analyzed starting at 205. However, as can be seen from steps 203 to 207, the analyses of both spectra are processed in parallel. In particular, a preliminary processing step is first encountered at steps 203 and 206 normalizing the respective positive and negative test spectra to vector quantities.

Figure 3:
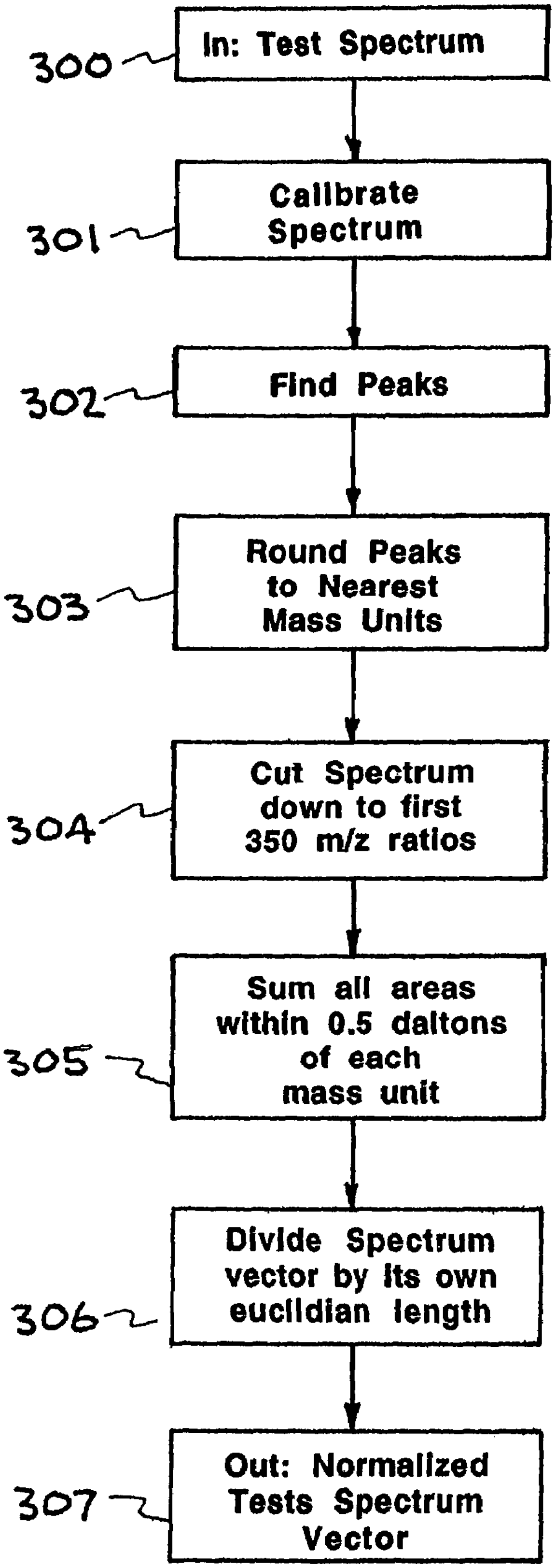
FIG. 3 is a flow chart illustrating an exemplary embodiment of the normalization process of the spectral identification algorithm.

Details of the normalization process for test spectra are shown in FIG. 3, starting at 300 with a subject test spectrum. The normalization procedure may be carried out by a data processing module of the data processing system which is specifically adapted for such a purpose. Examining the normalization of the positive spectral data first, the positive test spectrum is calibrated at step 301. The positive test spectrum is simplified to a vector of preferably double precision real numbers by first finding all peaks below a predetermined maximum m/z, e.g. 350.5, at step 302, and noting their masses and another peak attribute, such as area, height, or width. In an alternative embodiment, only selected peaks based on a predetermined selection criteria may be examined, such as those found within a specified m/z range or window. Next the masses of the peaks are rounded to the nearest whole mass unit at 303. All other peaks not below the maximum m/z are omitted at 304. The areas are summed at 305 where they fall on the same whole mass unit after rounding, and recorded as a vector of real numbers where the nth number corresponds to the combined areas of all peaks within 0.5 mass units of n. At 306, this vector is normalized to unit length by dividing it by its Euclidean length as computed by the Pythagorean theorem. That is, the length is computed by taking the square root of the sum of the squares of each number in the vector, and then each number in the vector is divided by that length. At 307, the normalized positive test spectrum vector is returned. A similar normalization process also occurs for the negative test spectrum to output a normalized negative test spectrum vector.

Following the normalization of the positive test spectrum in step 203 in FIG. 2, the algorithm proceeds to 204 where substantially matching positive spectra are found which substantially match the positive test spectrum. Similarly, substantially matching negative spectra are found at 207 which substantially match the negative test spectrum. The substantially matching procedure may be carried out by a second data processing module of the data processing system which is specifically adapted for such a purpose.

Figure 4:
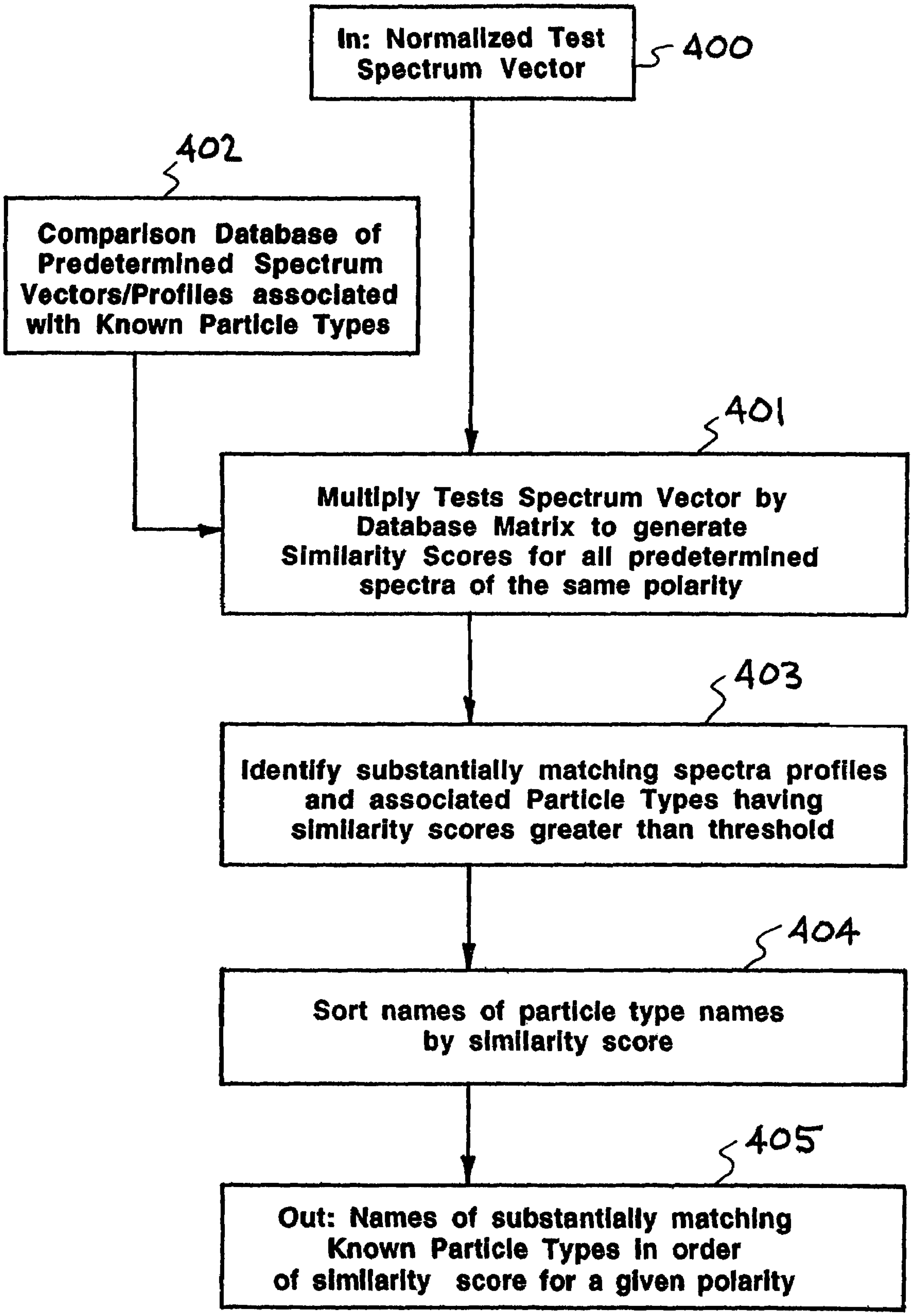
FIG. 4 is a flow chart illustrating an exemplary embodiment of a process for finding substantially matching spectra in the spectral identification algorithm.

Details of the substantially matching process for test spectra are shown in FIG. 4, starting at 400 with a normalized test spectrum vector. Examining first for the normalized positive test spectrum vector, the normalized positive test spectrum vector is compared at 401 to all spectra of the same respective polarity found in a database 402 of predetermined positive and negative spectra for known particle types. Thus the positive test spectrum is compared to all predetermined positive spectra in the database, each associated with a known particle type, e.g. *bacillus anthracis*. In particular, each of the normalized positive test spectrum vector is multiplied (dot product) by the transpose of each previously defined and scaled (normalized) spectrum vector of the same respective polarity in the database, where each database vector is labeled according to its origin. It is notable that one way to generate these predetermined spectra is by running known standards and simplifying their spectra into vectors. These predetermined standard vectors are then stored in the database, for example, as a vector matrix. In any event, the dot product of each vector multiplication produces a similarity score for all predetermined spectra of the same polarity representing their degrees of similarity on a scale of 0 to 1, with 0 being completely orthogonal and 1 being exactly identical.

Next, at step 403 "substantial similarity" between the test spectra and the database spectra of the same respective polarity is determined from the resulting similarity scores, with the determining criterion for substantial similarity being based on a similarity score threshold, also referred as a vigilance factor. For example, a predetermined positive database spectrum may be determined to be "substantially similar" to the positive test spectrum if the dot product exceeds a predetermined vigilance factor, such as 0.7. In other words, the vigilance factor is considered to be the minimum degree of similarity acceptable to call the test spectrum substantially similar to the standard. It is appreciated that other mathematical methods may be used to compare an unknown or "test" spectrum with a library of existing spectra types and identify it as the spectra type if matches most closely. And at step 404 the names of the particle types associated with substantially matching database spectra of a given polarity are sorted in order of similarity score, such as in decreasing order, for output at step 405.

Figure 5:
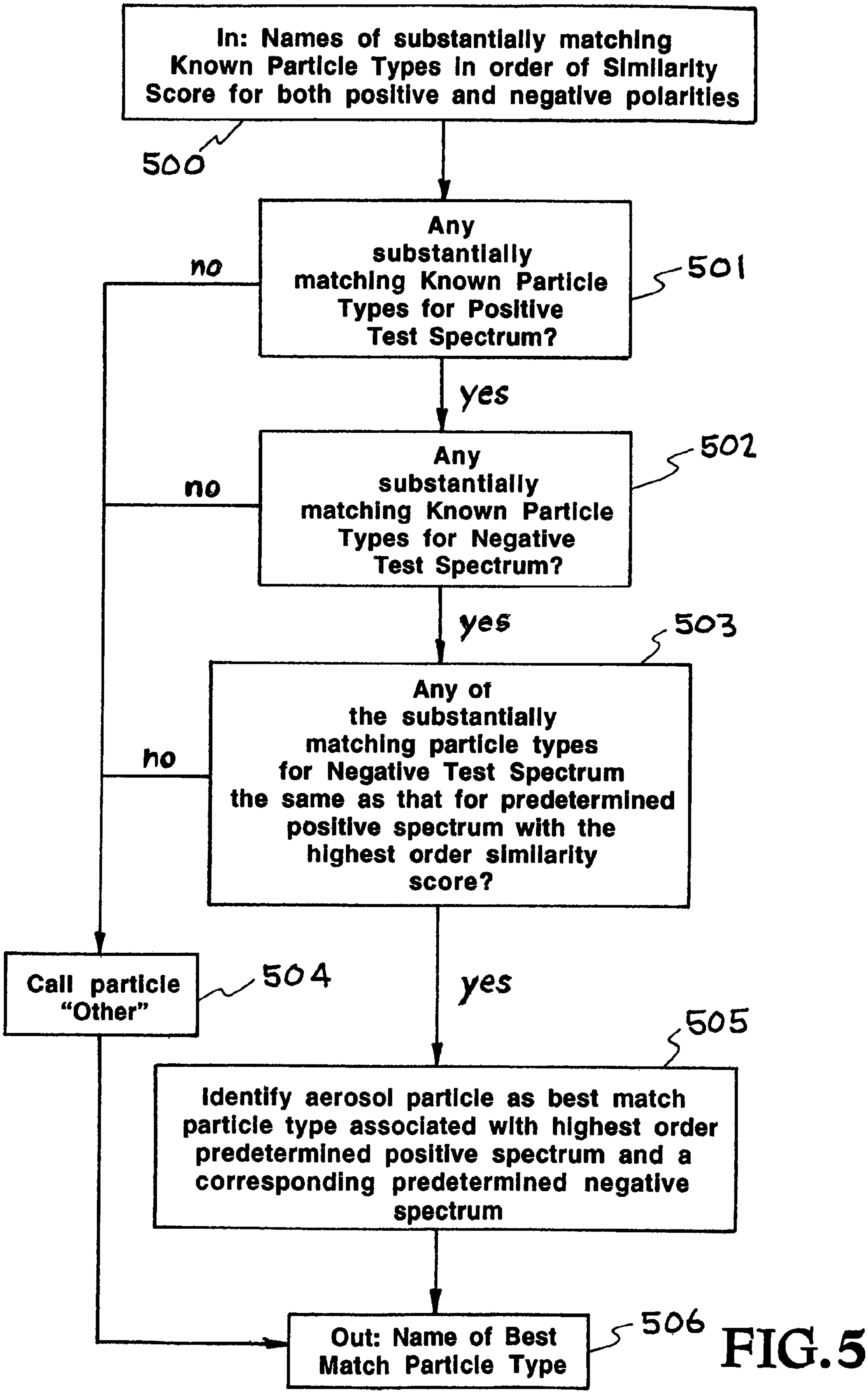
FIG. 5 is a flow chart illustrating an exemplary embodiment of a process for synthesizing results in the spectral identification algorithm.

Following the finding of substantially matching positive and negative spectra at steps 204 and 205, respectively, in FIG. 2 the results from both polarities are synthesized at step 208. FIG. 5 shows the details of an exemplary embodiment of the results synthesis for determining the identity of a single aerosol particle. At 500, the names of substantially matching known particle types in order or similarity score are received as input for both positive and negative polarities. At step 501, a determination is made if any substantially matching known particle types exist for positive spectra. If no, the aerosol particle is called "other" at 504 due to a failed identification. If a substantially matching known particle type is found for positive spectra, then a determination is made at step 502 whether any substantially matching known particle types exist for negative spectra. If no again, the particle is called "other" at 504 and identification for the particular aerosol particle terminates. If however, a substantially matching known particle type is found for negative spectra, then a further determination is made at step 503 whether any of the substantially matching particle types for negative spectra are the same as for the positive spectra with the highest order similarity score. Again, if no, then the particle is called "other" at 504. But if yes, then the aerosol particle is identified as the best matching one of the known particle types associated with the highest order positive spectra and any corresponding negative spectra. The results synthesis module ends with an output of the name of the best match particle type.

Generally, if both polarities "match" spectra profiles with the same particle type, then the test spectrum is identified as that particle type, i.e. assigned that particle label. In situations encountering multiple matches within database spectra of a given polarity, then the best match is considered to be the particle type associated with the highest order similarity score for the positive spectrum that has any corresponding substantial match with the negative spectrum. For example, if there were matches of 0.8 for "*Bacillus* Spores" and 0.75 for "Growth Medium" for the positive spectrum and matches of 0.9 for "Growth Medium" and 0.75 for "*Bacillus* Spores" for the negative, then the spectrum would be identified as "*Bacillus* Spores". If there is no match that matches both polarities, then the particle is labeled "Other" requiring further analysis.

It is notable here that in the exemplary embodiment of FIG. 5, the aerosol particle is identified with one of the known particle types from the database having associated therewith the highest order similarity score for all positive spectra, while having only a substantial match with a negative spectrum. However, in another exemplary embodiment not shown, an aerosol particle may be identified with one of the known particle types from the database having associated therewith the highest order similarity score for all negative spectra, while having only a substantial match with a positive spectrum. In any case, positive and negative spectra are considered in the identification process.

Figure 7:
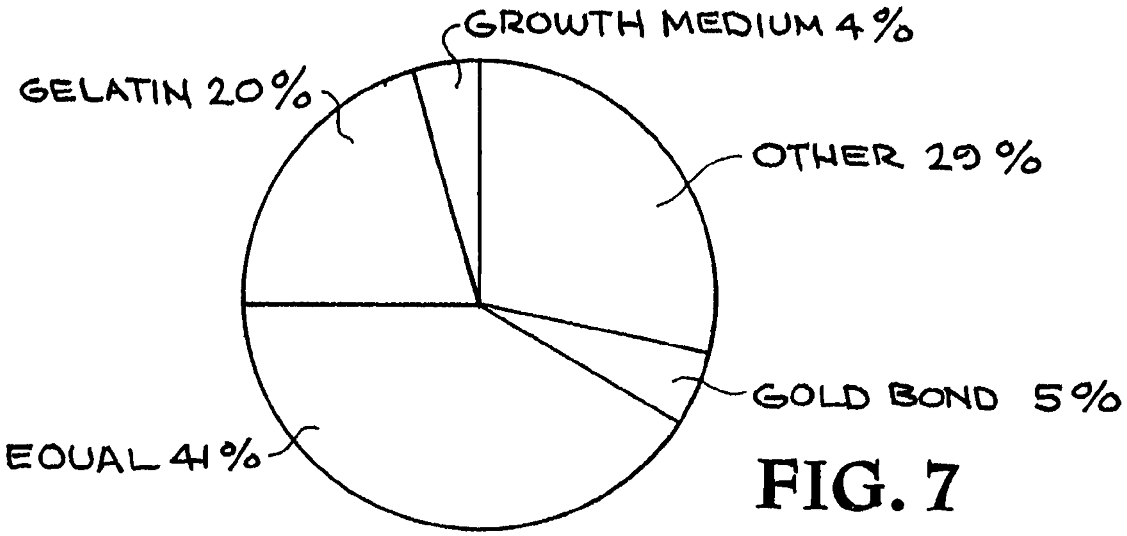
FIG. 7 is a pie chart and legend illustrating the identification results of a first complex mixture.
Figure 8:
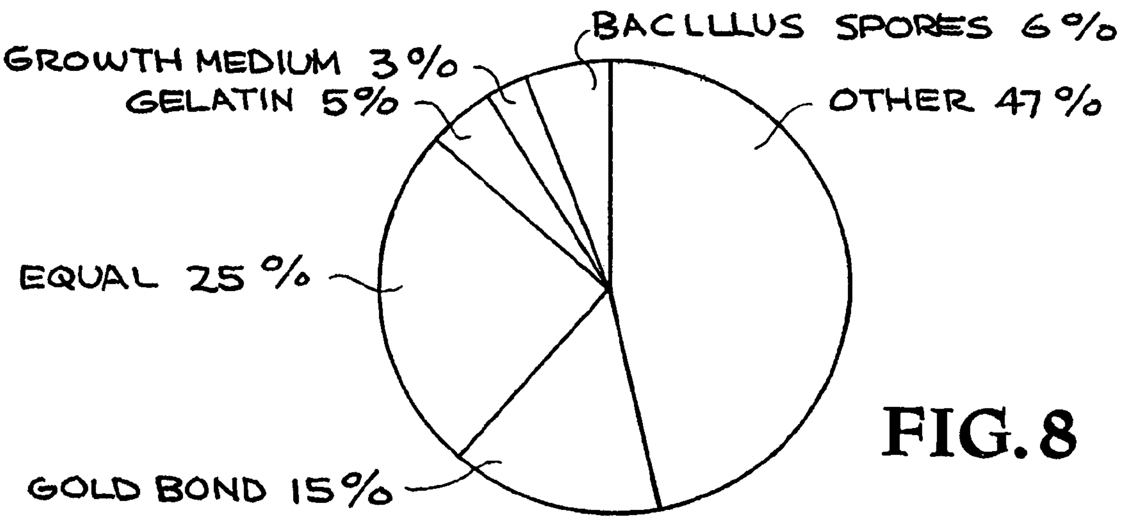
FIG. 8 is a pie chart and legend illustrating the identification results of a second complex mixture with additional substances, including *Bacillus* spores, added to the first complex mixture of FIG. 7.
Figure 9:
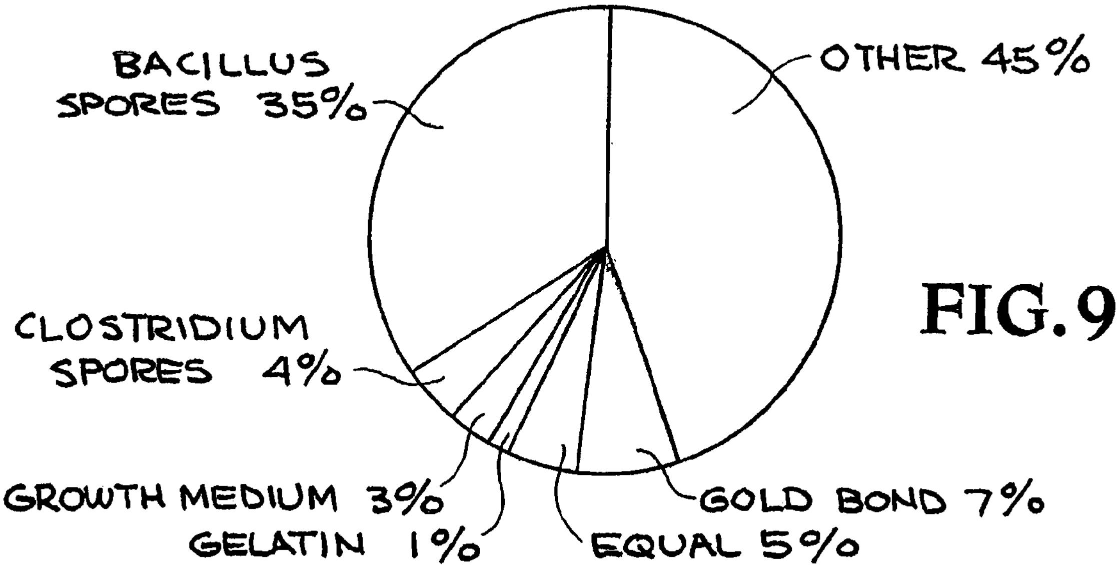
FIG. 9 is a pie chart and legend illustrating the identification results of a third complex mixture with still additional substances, including Clostridium, added to the second complex mixture of FIG. 8.

Upon completion of the spectrum identification algorithm of 105 in FIG. 1, the detection method proceeds to communicate the results to a user in real time. The communication may be a reporting of the aerosol particle identities by visual display, such as on a CRT screen, audio, or other means of notification. A notification signal may particularly be useful in alerting a user to the identification of a particular substance or substances which were targeted in the inspection, such as the detection of biological or chemical threat agents. For the visual reporting of the particle identification, a pie chart, bar graph, or other comparative visualization tool may be utilized, such as shown in FIGS. 7–9, indicating particles types and concentrations thereof. In one embodiment, the visual display would prioritize the most serious threats for display in a more prominent location than routine particles. In any case, the results are presented to a user automatically, and virtually instantaneously, while spectral analysis proceeds.

FIGS. 7–9 illustrate the detection results of an experiment conducted by Applicants to demonstrate the present invention's ability for detecting bacterial spores, e.g. *Bacillus* spores, in a complex mixture. FIG. 7 shows a first mixture of non-biological test samples, absent *Bacillus* spores. And FIG. 8 shows the same mixture of FIG. 7 with *Bacillus* spores added, as well as two previously uncharacterized samples of baking soda and powdered sugar. Furthermore, FIG. 9 shows the mixture of FIG. 8 with Clostridium spores nebulized into the sample. As can be seen in FIGS. 8 and 9, *Bacillus* spores were detected by the present invention even for *Bacillus* spore concentrations at 6% and 4% respectively.

Figure 10:
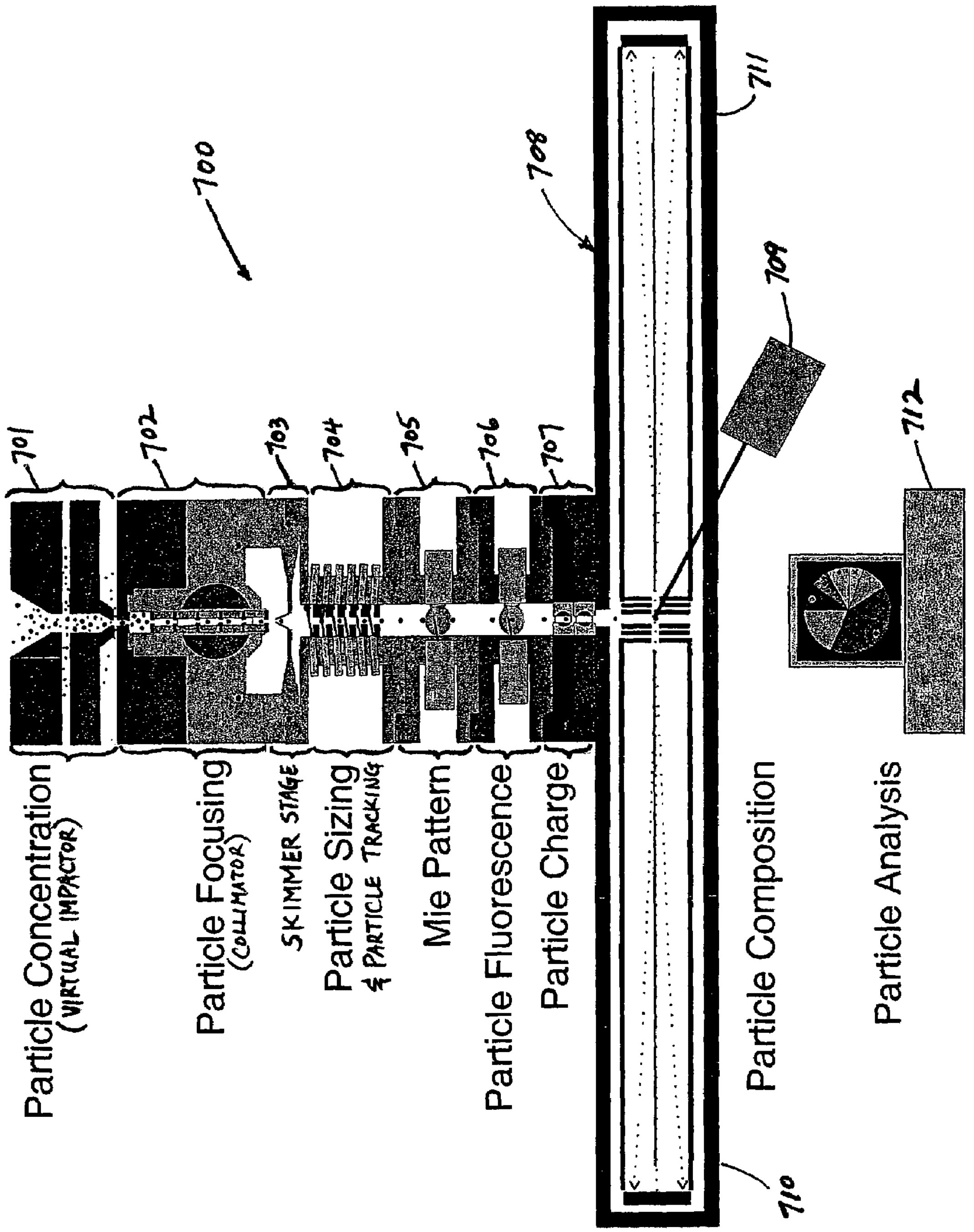
FIG. 10 is a schematic view of an exemplary embodiment of the system of the present invention, and illustrating some of the screening modules for determining qualifying aerosol particles for detailed analysis in the mass spectrometer stage.

FIG. 10 shows another exemplary embodiment of an aerosol rapid detection system and method, generally indicated at reference character 700, for interrogating individual aerosol particles to provide in-situ and real-time physical and chemical characterization/identification of a sample and determine the presence of biological cells or chemical agents of interest. Generally, the system 700 preferably utilizes a single-particle mass spectrometer for analyzing single particles, and additionally incorporates one or more screening components and processes which operate to detect and determine one or more of the size, symmetry, shape, chemical composition and/or biological family of individual aerosol particles at kilohertz rates, to determine which ones qualify for detailed mass spectrometric analysis based on predetermined qualification criteria. Preferably, analytically orthogonal screening techniques are utilized to selectively target only qualifying particles for individual ablation and detailed mass spectrometric analysis. Moreover, neural network pattern recognition techniques (similar to those utilized for comparing mass spectrometry data previously described) are preferably used to establish and implement the qualification/selection criteria. By first screening for qualifying particles, the system 700 is able to reduce the cycling/repetition rate of the mass spectrometry stage and thereby overcome the speed limitation thereof which is typically capable of analyzing approximately $10^3$ particles per second. In this manner, detection sensitivity is improved and achieved with virtually instantaneous, e.g. millisecond, analysis times. In particular, overcoming the speed/cycling limitation enables the system 100 to detect one Agent Containing Particle per Liter of Air (ACPLA) in a background of at least $10^6$ Total Particles per Liter of Air (TPLA) in one minute, with $P_{fa}$ of $10^{-5}$ or better for a range of organisms including bacterial spores, bacterial vegetative cells, viruses, and toxins. And consequently, increasing the sensitivity of the mass spectrometry stage by screening operates to reduce the false alarm rate of the system. It is appreciated that the term "predetermined" as used herein and in the claims as a modifier is defined to mean that the modified term (e.g. "qualification criteria") is user-specified, or simply known, designated, or determined in advance.

For the embodiments of the present invention involving one or more of the screening methods (described in detail below), it is notable that the mass spectrometer may be a bipolar single-particle mass spectrometer, such as for example the aerosol time of flight mass spectrometer (ATOFMS) arrangement of the type previously discussed and shown in FIG. 6. In the alternative, the screening methods may be utilized together with monopolar single particle mass spectrometers (not shown) to achieve the efficiencies and benefits described herein.

Turning now to FIG. 10, the exemplary system 700 is shown generally having nine operative regions, including: a virtual impactor region 701 for concentrating the inlet flow, a collimater/particle focusing inlet 702 for producing a collimated particle beam, skimmer stage/region 703 for removing excess air, a particle tracking/sizing region 704 for profiling the individual particles of the particle beam, a Mie scattering region 705 for determining particle shape, a laser-induced fluorescence region 706 for determining particles of biological origin, a charge detection region 707, and a mass spectrometry region 708 where chemical composition of the particles is probed by single-particle laser desorption/onization for particle identification, and a particle analyzing module 712 where test spectra obtained from particle ablation is compared against predetermined spectra of known particle types. The mass spectrometry region 708 is particularly shown having a bipolar configuration with opposing flight tubes 710 and 711, and an ablation laser 709 positioned to target incoming particles.

Generally, the system 700 operates by drawing aerosol particles into the system 700, and size selecting and pre-concentrating them at the virtual impactor 701. The particles are then collimated into a particle beam at the collimator 702 using particle focusing techniques, such as acoustic and aerodynamic focusing. Each particle is tracked at the particle tracking/sizing region 704, where preferably one or both of particle velocity and trajectory are determined. Furthermore, each particle is interrogated with at least one of five different orthogonal analysis techniques for screening the particle beam to determine which particles qualify for mass spectrometric analysis at the mass spectrometry region 708 based on predetermined qualification criteria. The screening methods include at least one, but preferably all, of the following: determining particle size at the tracking/sizing region; determining particle symmetry also at the tracking/sizing region (or alternatively in the Mie scattering region 705); determining particle shape at the Mie scattering region 705; testing for biological components at the UV fluorescence stage 706, and determining the amount of charge on a particle. Finally, upon a determination that predetermined qualification criteria has been satisfied, mass spectrometric analysis is individually performed on the qualifying particles via laser desorption/ionization at 707 for identification of the qualifying particles. Each of the stages is preferably arranged in order of decreasing speed and increasing specificity, which allows the system 700 to operate in a very wide range of background environments and concentrations. It is appreciated that aerosol particles to be selectively identified are collected or otherwise acquired prior to entering the present invention (e.g. at 701) using various techniques, such as those previously discussed with respect to FIG. 1, as well as other methods known in the art. What follows is a detailed description of the operation of each particular region.

Operation of the system 700 begins by drawing air into the virtual impactor 701 to concentrate a large volume per minute of aerosol particles into a substantially reduced output flow. Virtual impactors are common tools known in the aerosol sciences used to concentrate a pre-determined particle size range by one or more orders of magnitude. They are a form of inertial classifier where particles are separated according to their aerodynamic diameters. The virtual impactor may be configured to concentrate, for example, about 400 liters per minute of aerosol particles into about 3 liters per minute output flow, with about one liter per minute of this to be drawn next into the nozzle stage. Furthermore, particle-laden air is preferably sampled through an accelerating nozzle and directed toward a collection probe. A substantial percentage of the inlet flow (e.g. ~90%), is diverted 90 degrees from the probe as shown in FIG. 1. Small particles will follow the major flow lines and be diverted from the probe. Larger particles, however, due to their greater inertia, will cross the major airflow lines and be collected in the minor flow through the collection probe (e.g. ~10% of the inlet flow). Since particular interest lies in bio-aerosol particles that are about 1 micron to about 10 microns in diameter, a cutoff to collect particles greater than about 1 micron can be achieved. This feature operates to keep the background particle concentrations manageable, since the background concentration of particles less than about 1 micron is typically much greater than those that are greater than 1 micron. The result of virtual impaction is an approximately ten-fold increase in the concentration of the predetermined particle size range of interest in the minor flow. It is appreciated that additional stages can be added in series to generate higher concentrations of particles. For example, a two-stage virtual impactor may be employed, as shown in FIG. 1, to increase the current sampling rate (~1 lpm), or effectively pre-concentrate the sampled aerosol by up to ~2 orders of magnitude. In order to predict system performance two assumptions may be made: (1) the virtual impactor has zero losses in the 1–10 micron range, and (2) the virtual impactor's size selection curve is a step function at 1 micron allowing only particles larger than 1 micron into the detector inlet.

After virtual impaction, particles are collimated into a coherent stream in the collimator 702, and accelerated to size specific velocities. Collimation is accomplished at a particle focusing inlet which defines the sampling rate and creates the low divergence particle beam. The collimated particle beam enables each subsequent stage, including tracking, screening, mass spectrometry, and particle identity determination to be performed in real time succession. The more efficiently and effectively the inlet forms this beam (collimation efficiency), the better the entire instrument operates because every subsequent region depends on the particle to continue in a straight line down the center of the instrument in order to perform further interrogation of the in-flight particles. Applicants have determined from experiments at the Lawrence Livermore National Laboratory that the particle inlet will require a collimation efficiency of approximately 1 out of every 10 particles moving straight down the center of the instrument in order to meet the 1 ACPLA in 1 minute detection goal. The required collimation efficiency may be achieved using at least one and preferably both of acoustic focusing and aerodynamic focusing techniques in concert (shown together in FIG. 13), wherein aerodynamic focusing (shown independently in FIG. 12) exploits the air flow pattern through constrictions to focus particles and acoustic focusing (shown independently in FIG. 11) uses standing waves to focus particles at the pressure nodes towards a central axis of the particle beam.

Figure 12:
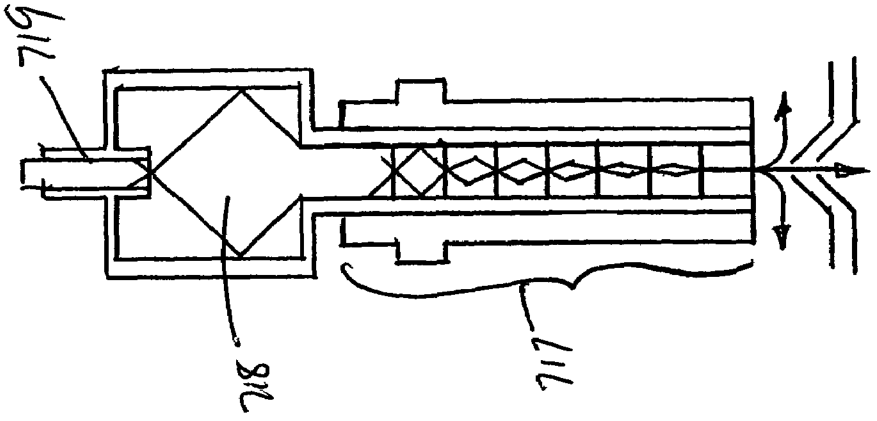
FIG. 12 is a schematic side view of a second exemplary embodiment of a collimator employing multiple stage aerodynamic focusing.
Figure 13:
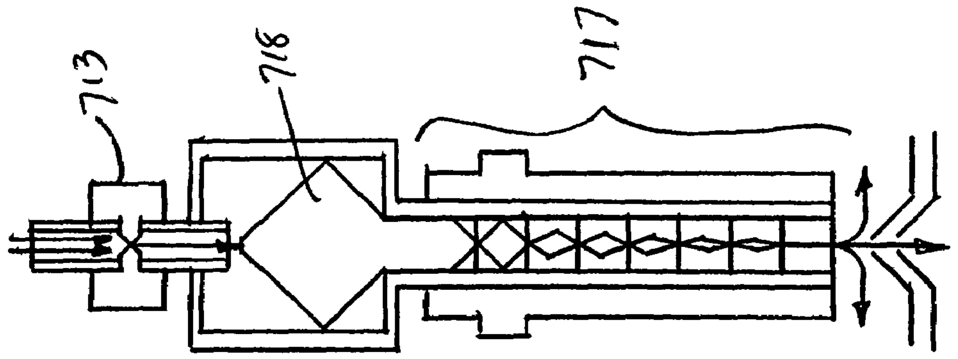
FIG. 13 is a schematic side view of a third exemplary embodiment of a collimator employing both acoustic focusing and multiple stage aerodynamic focusing.
Figure 14:
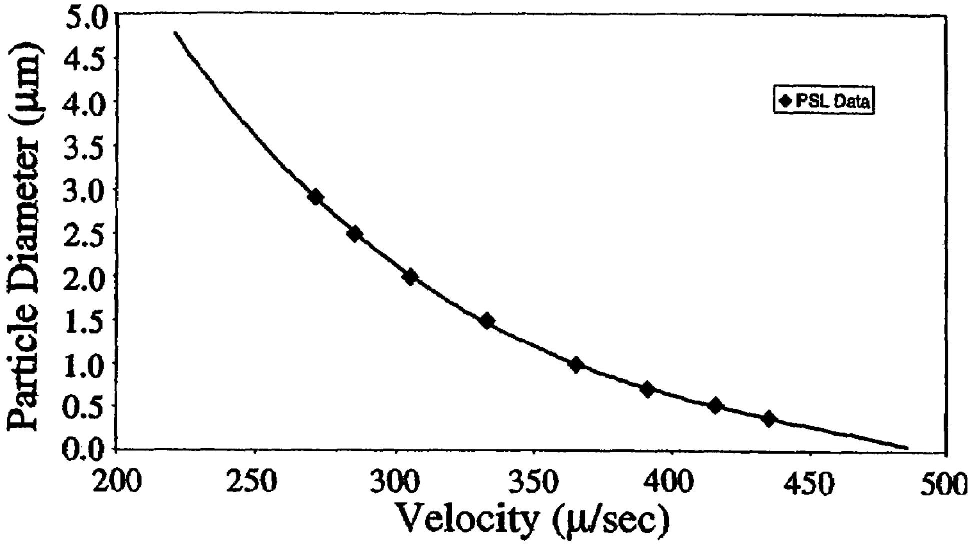
FIG. 14 is a graph of an exemplary velocity to size calibration curve.

Aerodynamic focusing, shown in FIG. 12, is a strategy towards efficient particle sampling into a vacuum and utilizes inertial forces to move particles. This methodology takes advantage of particle motion in a gas as both pass through a constriction. In particular, aerodynamic focusing is accomplished by passing the aerosol through one or a series of sequentially restrictive apertures/orifices, i.e. aerodynamic lenses 717, progressively focusing the particles into a coherent beam traveling the centerline of the apertures, as shown in FIG. 12. For illustrative purposes, the series of apertures may range in diameter from 1400 microns to 400 microns. Prior to focusing, the particles are preferably passed through a flow limiting orifice 719, and a particle relaxation chamber 718 having, for example, a pressure of 50–100 torr. During aerodynamic focusing, the gas, and hence the particles, are accelerated with the particles taking on size specific velocities. FIG. 14 is a typical velocity to size calibration curve. When the sampled gas undergoes supersonic expansion into a vacuum, due to their greater inertia, the particles deviate from the streamlines of the expanding gas. Only particles of a single diameter ($d_p$) will most efficiently be focused into the centerline axis of a particle beam when passed through a single orifice with a diameter ($d_o$) at a given pressure ($P_o$). The focusing efficiency drops quickly for particles with $d_p$ larger or smaller than the optimum $d_p$. A preferred design of a converging nozzle has been optimized at ~1 micron. However, other various designs for the aerodynamic lens inlet may be employed in the alternative consisting of a series of orifices of decreasing diameters ($d_o$) that can be configured to focus a wider range of particle sizes of ~1–10 micron.

Figure 11:
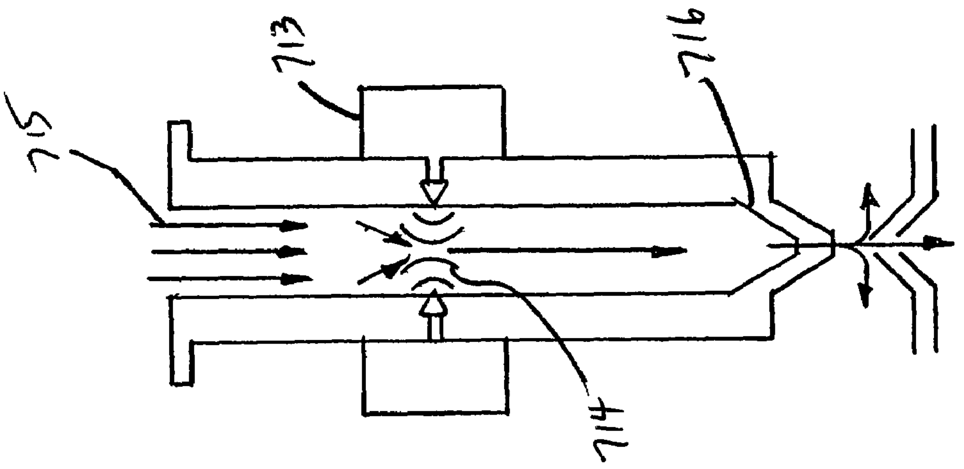
FIG. 11 is a schematic side view of a first exemplary embodiment of a collimator employing acoustic focusing and single stage aerodynamic focusing.

Acoustic focusing operates to increase the efficiency of the aerodynamic nozzle by easing the transition of the aerosol into the nozzle. Ultrasonic standing acoustic waves are used as a means to isolate aerosol particles within a flowing air stream by utilizing the time-varying properties of acoustic radiation pressure in a steady-state resonant cavity. As shown in FIG. 11, acoustic focusing is accomplished by passing the aerosol stream 715 through an ultra-sonic standing wave field 714 produced by an acoustic focusing collar 713 and tuned to shift particle trajectories towards the centerline of the aerodynamic nozzle 716. Concentration of particles focused into the system can be controlled by varying the degree of acoustic focusing by changing the frequency of the ultra-sonic field. For an aerosol, a time-averaged force is experienced by the aerosol particles forcing them to a spatial location in the proximity of a pressure node. The geometry of an acoustic cavity can be designed such that the pressure nodes in the field coincide with spatial positions within favorable streamlines just prior to the converging nozzle, thereby reducing or eliminating the need for particle focusing by the nozzle itself. In addition, and as shown in FIG. 10, the gas portion of the aerosol may be removed through stages of differential pumping separated by skimmers (703) that permit the particles to pass into the vacuum region (approximately $10^{-4}$ torr) without perturbing their trajectories or velocities.

Next, the particle beam is passed through a tracking/sizing region shown as module 704 of FIG. 10, configured to track each particle through the instrument in order to time subsequent processes which target only individually selected particles. In particular, by initially tracking particles, the downstream screening and ablation steps are able to uniquely identify a particle as it flows through the instrument. Preferably the tracking/sizing region operates to track particles by determining the velocity of the particle, which also defines its aerodynamic diameter. And particle trajectory may also be determined in the tracking/sizing region to enhance particle tracking. The particle size determination achieved in the tracking process may be utilized as the first screening step for applying predetermined qualification criteria. In this case, the qualification criteria associated with the size determination is that it must come within a predetermined particle size range. As previously discussed, this can be, for example, particles greater than 1 micron, or less than 10 microns, or any other range indicative of a desired target particle of interest.

Preferably an optical detector of a type known in the art is used for tracking. In an exemplary embodiment, the optical detector includes at least two or more photo-sensors serially arranged along a flow path of the particle beam and capable of optically detecting particles passing by a photo-sensor. And each photo-sensor preferably includes a laser (e.g. continuous wave laser) positioned alongside the path of the collimated beam, and a corresponding photo-multiplier tubes (PMT) associated with the laser. This optical detector arrangement is capable of determining particle velocities from the time of flight measurement between the photo-sensors, and determining particle trajectories from the differences in response between the photo-sensors. It is appreciated that this and other techniques screen the aerosol particles individually while in flight without disturbing the flight paths of the particles, to ascertain qualifying ones based on predetermined qualification or selection criteria. In FIG. 10, an illustrative embodiment having a tracking/sizing region 704 using six continuous wave lasers, such as six 660 nm diode lasers which are focused to a spot size of about 300 microns. The greater number of lasers is in order to reduce the confusion of the system during periods of high particle concentration as well as to have built-in redundancy to prevent system downtime. Redundancy in this region is preferred because this is the section on which all the subsequent regions depend. The choice of a relatively long laser wavelength for this region combined with a variable detection threshold on the PMTs will also allow this region to effectively ignore any small particles that pass through the virtual impactor and particle focusing inlet (both of which are optimized to reject small particles).

Figure 18:
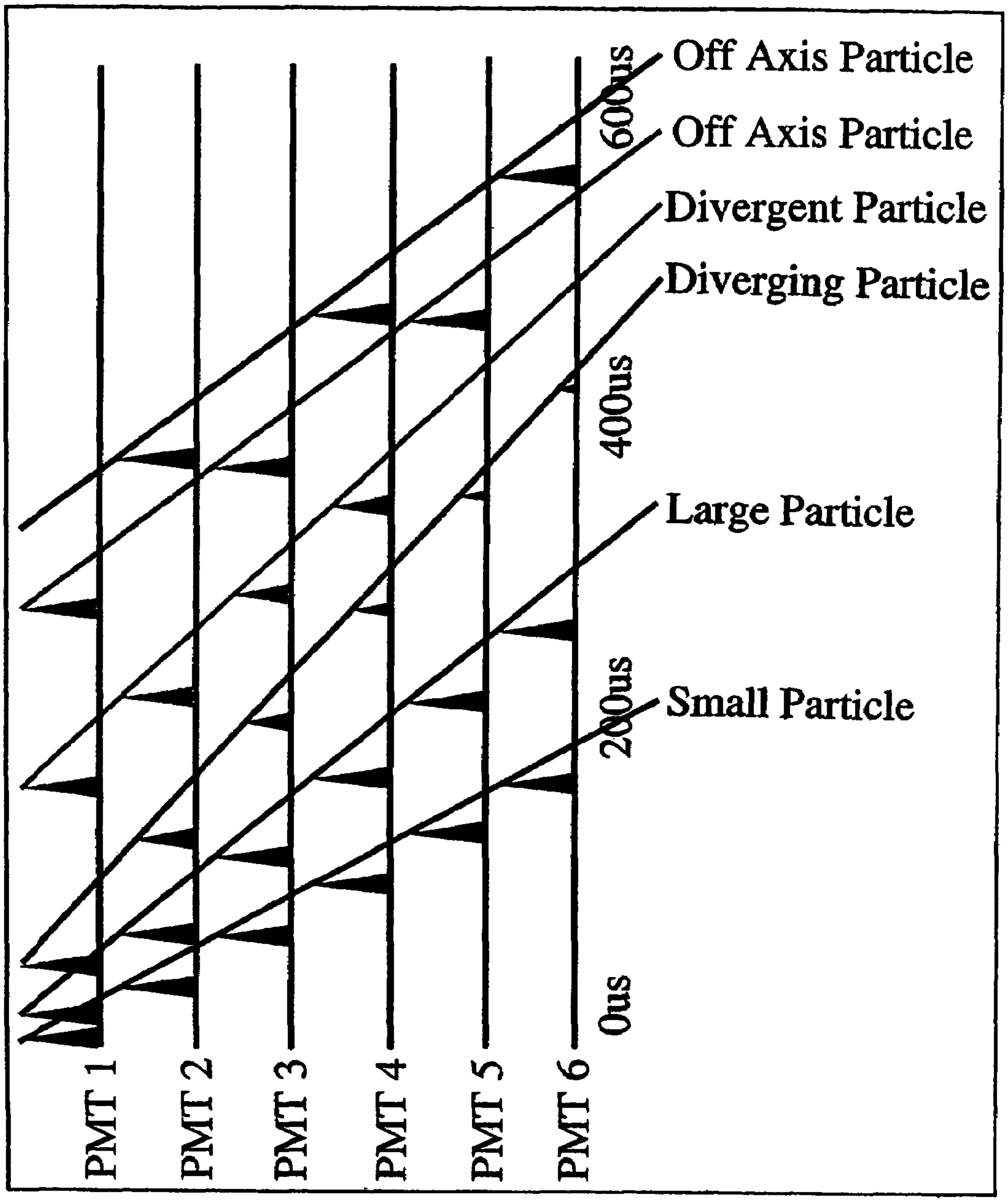
FIG. 18 is a graph illustrating how differences in trajectories result in recognizable patterns in the responses from photo-sensors (e.g. lasers and PMT's) used for particle tracking.

In any case, as a particle crosses any of the continuous wave lasers a pulse of scattered light is produced, and the corresponding PMT for that laser is used to determine the location of the particle in the instrument by the intensity of the scattered light. These pulses are then used to track the particles movement as a function of time, i.e. time of flight through the lasers, in order to determine particle velocity. Furthermore, the trajectories of the particles are ascertained by the difference in response by the lasers. FIG. 18 illustrates how differences in trajectories result in recognizable patterns in the responses from the six lasers. Thus, tracking a particle ascertains the position/location of the particle at a given time based on its velocity and flight trajectory.

Figure 15:
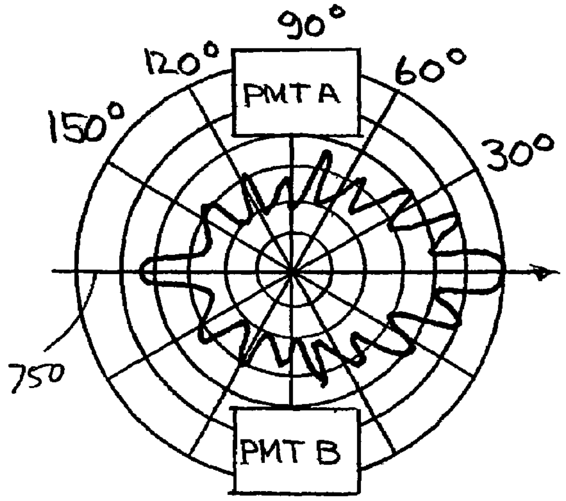
FIG. 15 is a graph showing an exemplary symmetric optical scattering pattern in the symmetry determination of the present invention.
Figure 16:
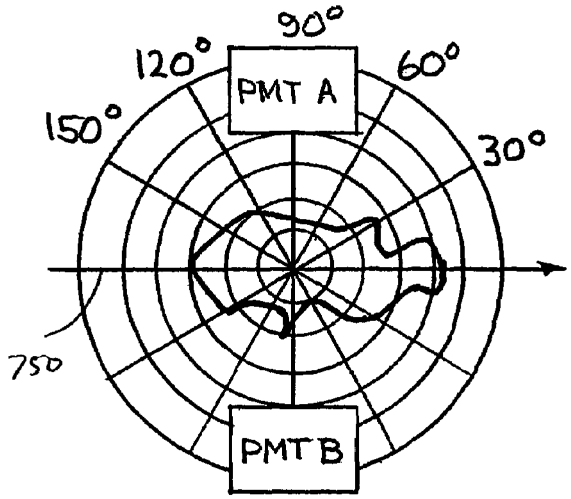
FIG. 16 is a graph showing an exemplary asymmetric optical scattering pattern in the symmetry determination of the present invention.
Figure 17:
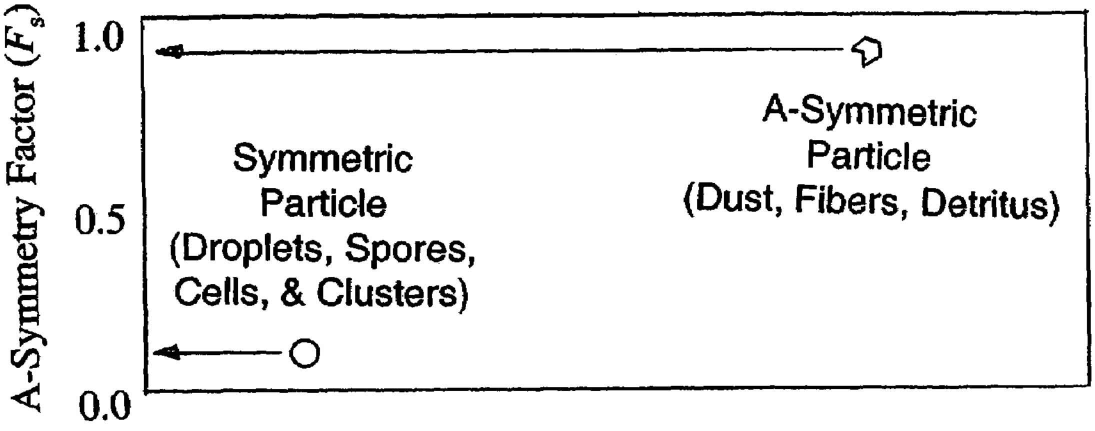
FIG. 17 is a chart illustrating particle types corresponding to known asymmetry factors (Fs).
Figure 23:
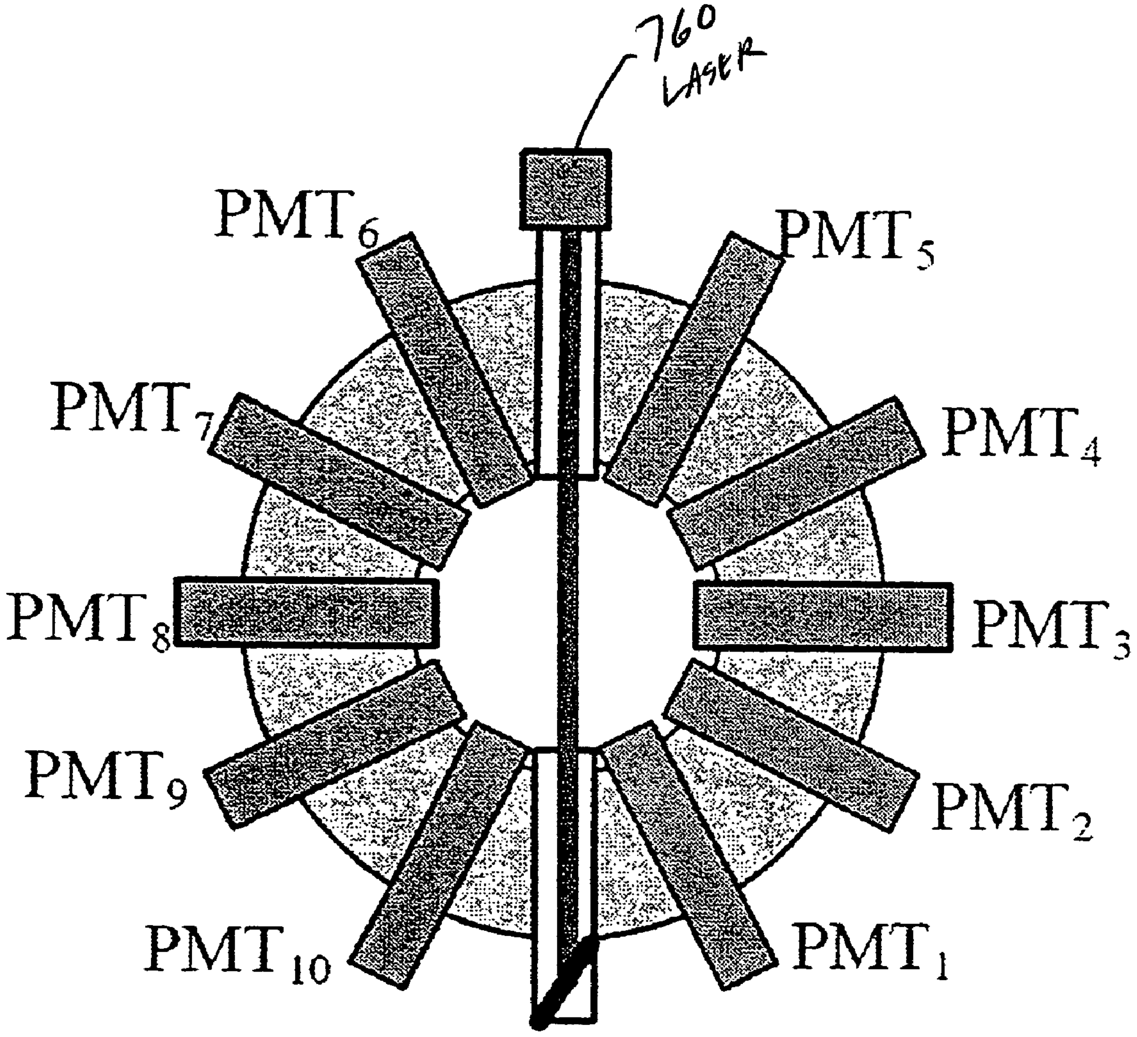
FIG. 23 is an schematic view of a first exemplary arrangement for determining particle shape utilizing an array of PMT tubes.

Additionally, as shown in FIGS. 15–17, the symmetry of the particle may be determined using a light source, such as a continuous wave laser, and a pair of opposing PMTs (e.g. PMT A and PMT B) located on opposite sides of an incident laser beam 750 used in the tracking/sizing region 704. FIG. 15 in particular shows a representative scatter pattern resulting from a symmetric particle, and FIG. 16 shows a representative scatter patter resulting from an asymmetric particle. FIG. 17 is a graph showing the differences in the asymmetry factor, $F_s$, for symmetric particles, such as droplets, spores, cells, and clusters, versus for asymmetric particles, such as dust, fibers, and detritus. If particle symmetry is used as a screening step, the qualification criteria would include having a predetermined particle symmetry or asymmetry, depending on the desired target particle(s) of interest. FIG. 23 illustrates another exemplary arrangement having 5 pairs of opposing PMTs (e.g. $PMT_{1-10}$) arranged in a circular configuration, with each PMT receiving a scattered intensity when a particle intersects a beam from a laser 760. The surrounding arrangement and physical viewing angle of each PMT enables symmetry to be determined based on a center of gravity computation known in the art. For example, if all the PMT intensity values are identical, the center of gravity will be located at the center. It is appreciated that shape determination may also be determined using a similar if not same arrangement of photo-sensors (e.g. PMTs) as used for symmetry determination, as will be described next.

Figure 26:
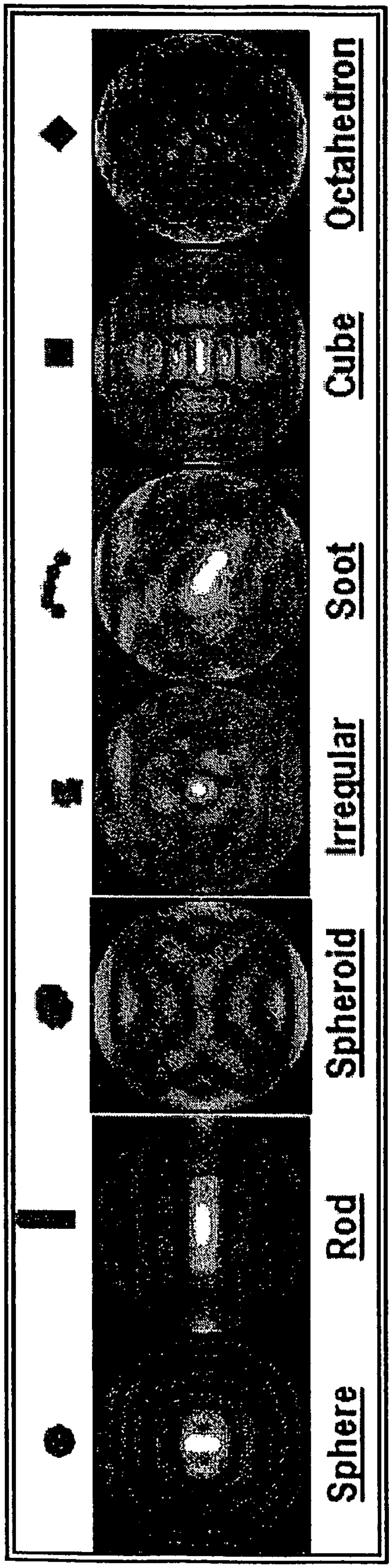
FIG. 26 is a series of backscatter patterns generated from common particle shapes acquired by the second exemplary arrangement of FIGS. 24, 25.

Once the velocity, trajectory, and even symmetry of each particle are determined, the shape of the particle is determined at a shape determination stage using two-dimensional optical scattering patterns in the Mie scattering region 705 shown in FIG. 10. In the Mie scattering region the interaction of light and an aerosol particle of a size close to but larger than the wavelength of the light (i.e. similar dimensions), produces distinct patterns dependant on the shape of the particle. For example, and as shown in FIG. 26, spherical particles produce a diffraction pattern, rod shaped particles produce a bright band orthogonal to the long axis of the particle, and irregularly shaped particles produce randomly speckled patterns. It is known in the art that two principle techniques for Mie pattern imaging are available. The first is achieved through the use of focusing optics and segmented silicon detectors, and the second is achieved using parabolic reflectors, focusing optics, and CCD camera detectors. It is intended that either approach be utilized when screening based on particle shape. Moreover, particle shape determination is preferably used as a screening step in the present invention, with the qualification criteria including having a predetermined shape determined from the scattering patterns.

Figure 19:
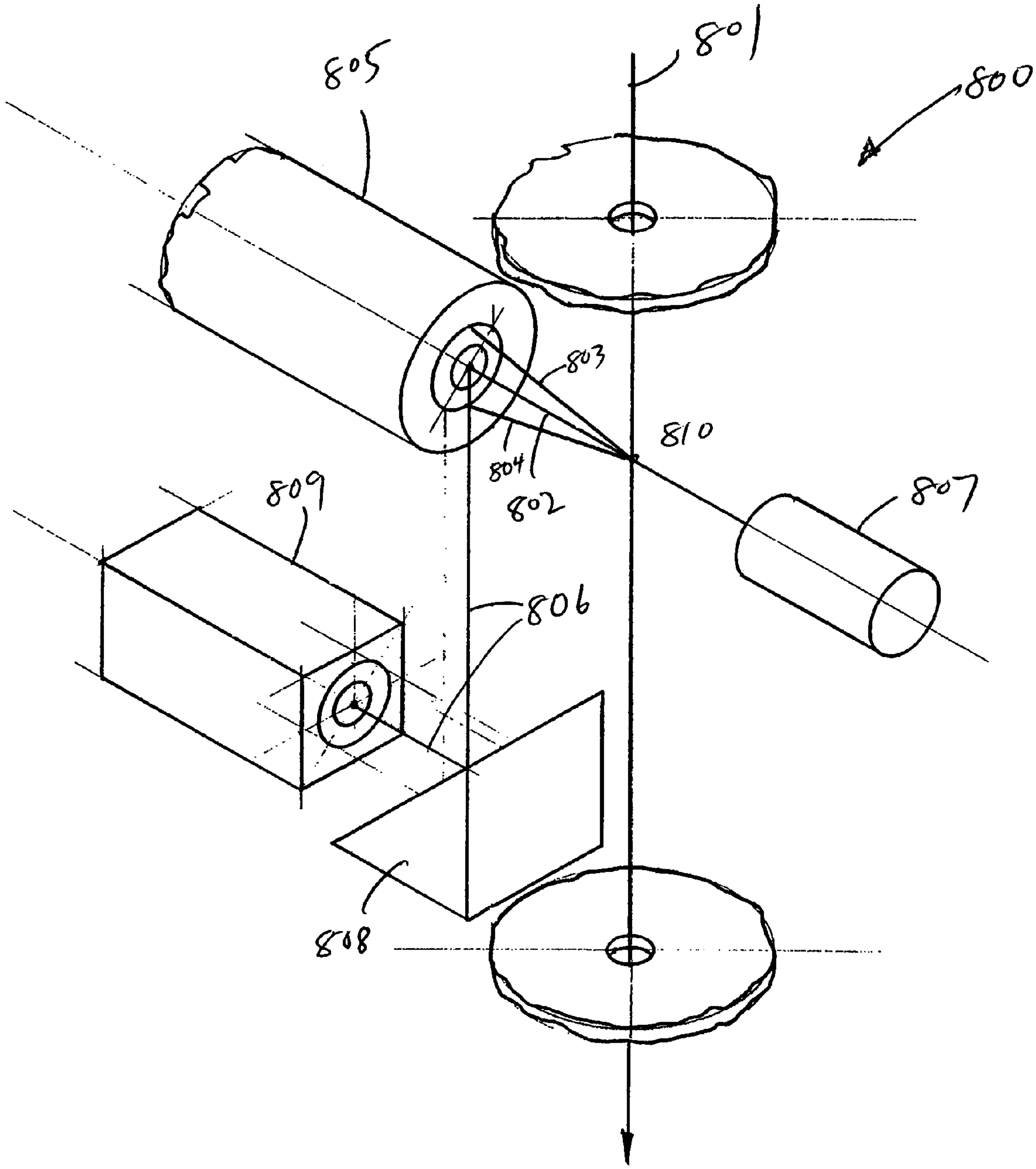
FIG. 19 is a perspective view of an exemplary physical configuration of the shape determination stage for determining the two-dimensional optical scattering patterns.

In a preferred embodiment, the shape of a particle is determined using a multi-channel, spatially-resolved photo-sensor array adapted to measure at least two-dimensional optical scattering patterns produced from light scattered by a passing particle. In other words three-dimensional optical scattering patterns are also contemplated by the present invention. And preferably still, the at least two-dimensional optical scattering patterns are produced from the scattered light within a 4π solid angle. A first exemplary embodiment and physical configuration of a module for Mie scattering is shown in FIG. 19, indicated at reference character 800, where a particle flowing in a particle beam 801 crosses an incident laser beam 805 at point 810 and into a light dump 807. The scattered light produced thereby, indicated at 803 and 804, is reflected (806) onto a segmented PMT 809 via a mirrored surface 808. The scattered pattern is shown on the face of the PMT 809, from which the shape determination is made. Although not shown in the drawings, another illustrative Mie scattering example uses a 532 nm continuous wave laser at 50 mW to scatter light from each particle as it exits the tracking/sizing region. And preferably a 32 to 64 channel spatially resolved PMT is used to measure the scattered light emitted in the backward direction, such as from 10 degrees to 70 degrees. Over this range of angles, theory and experimentation suggest that the described patterns will be recognizable. And in another exemplary embodiment (not shown), six segmented PMTs are used, each having 32 pixel elements, with each pixel having a coverage of about 1.5–2 degrees. This angular resolution serves to resolve the detailed scatter pattern from each particle, which contains details about particle shape and refractive index. For example, the diffraction pattern from a 2 micron spherical particle should have from 5 to 8 pixels per diffraction band to provide sufficient oversampling to accurately resolve the bands from one another.

Figure 24:
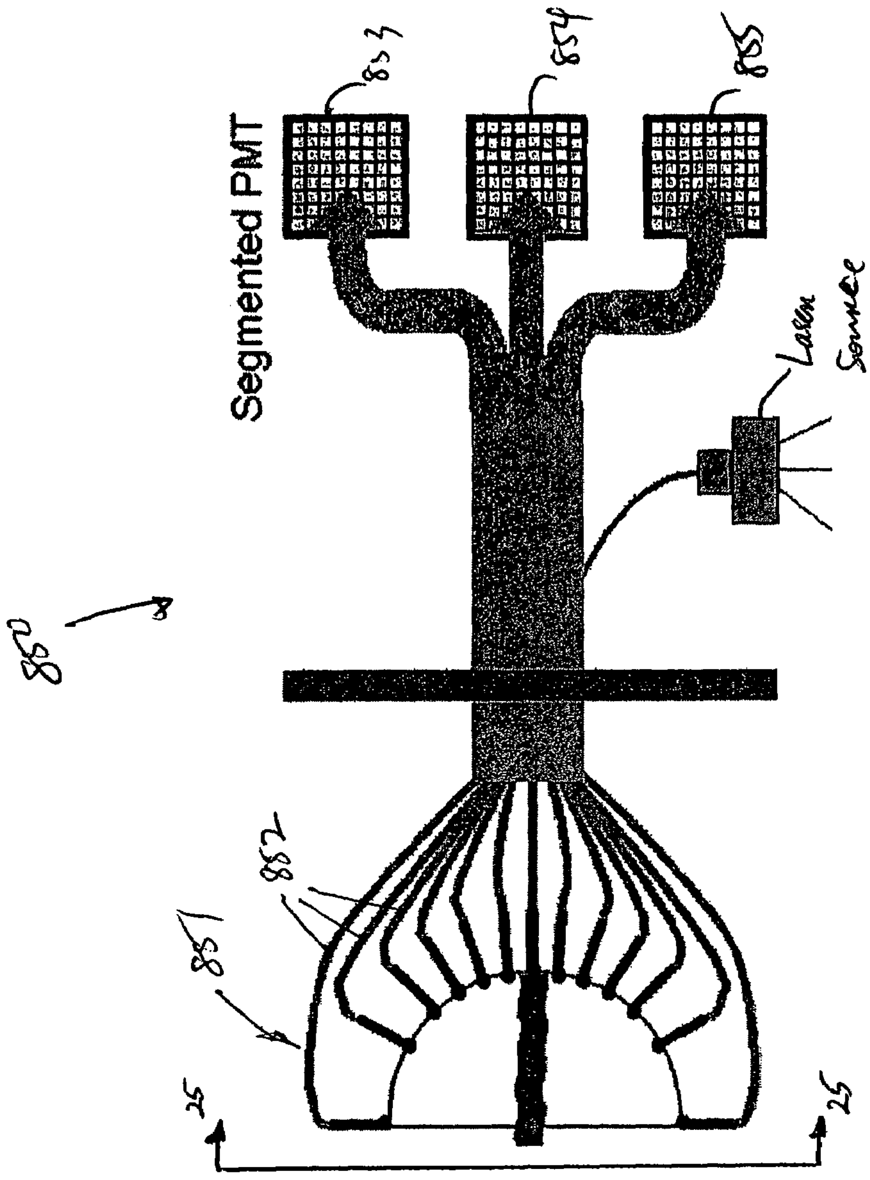
FIG. 24 is a schematic side view of a second exemplary arrangement for determining particle shape utilizing a FIG. 25 is a front view of the arrangement for determining particle shape shown in FIG. 24 taken along the line 25—25.
Figure 25:
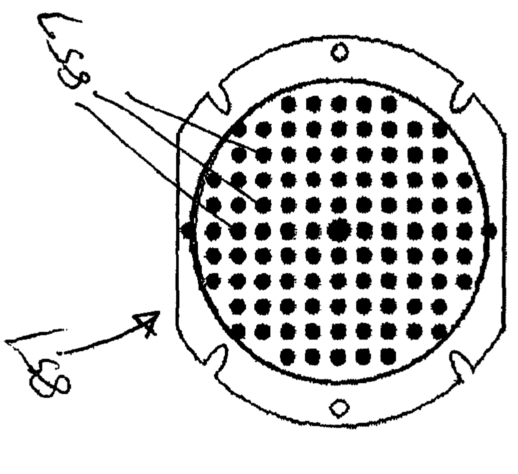

FIGS. 24 and 25 show another exemplary embodiment of a multi-channel, spatially-resolved photo-sensor array, generally indicated at reference character 850, adapted to measure at least two-dimensional optical scattering patterns produced from light scattered by a passing particle. This system is configured to directly image Mie patterns from single particles over a large field of view (e.g. about 0.5 $mm^3$). Collection of scattered light is accomplished using a hemispherical lens array 851 coupled to a plurality of fiber optics 852 at a plurality of end points 857 which deliver the scattered light from the center of the hemisphere to one or more (3 shown) segmented PMTs 853–855. Particles are introduced to the system through a focusing inlet designed to place the particle in the center of the hemisphere. And laser light is delivered from a source 856 to the particle through the center of the hemisphere.

Figure 20:
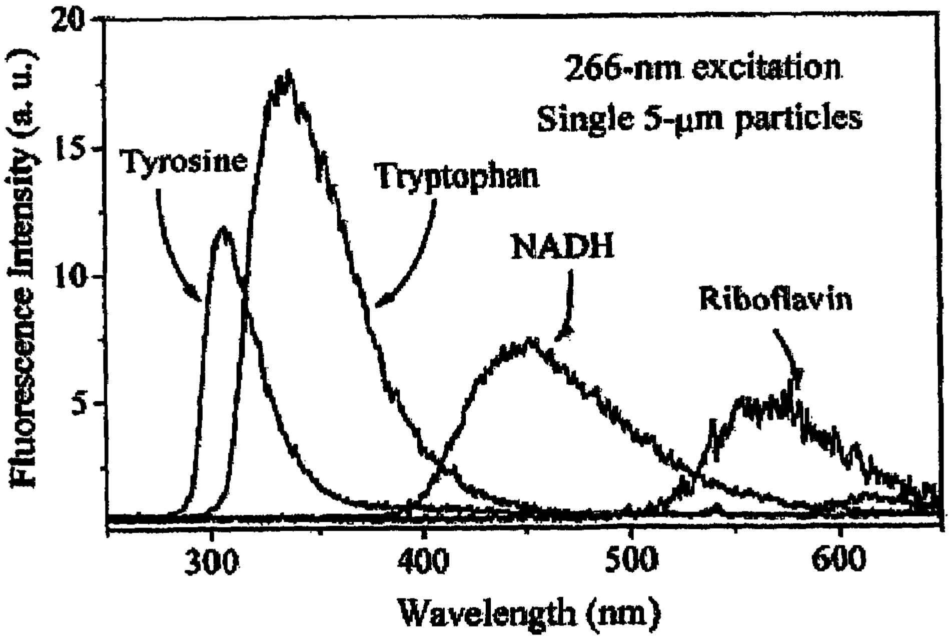
FIG. 20 is a graph showing an exemplary biological fluorescence intensity spectrum for various amino acids at various wavelengths

Following the shape determination, a fluorescence stage, indicated at 706 in FIG. 10 determines if any given particle is biological in nature. Biological material is composed of several amino acids that are known to fluoresce when exposed to radiation in a predetermined wavelength range, as indicated in FIG. 20. For example, biological material is known to fluoresce if excited by 266 nm radiation, and FIG. 20 charts the fluorescence intensities of Tyrosine, Tryptophan, NADH, and Riboflavin at 266 nm excitation for single 5 micron particles. In any case, if the screening includes a determination of whether a particle is a biological particle, an excitation laser is triggered to intersect each particle that is screened to have an appropriate size and shape to be a biological particle. A segmented PMT with a band pass filter, for example, is used to collect the resulting fluorescent spectrum from 300 to 610 nm with 10 nm increments. The fluorescence region is preferably designed to probe the laser induced fluorescence properties of each particle, preferably using two excitation wavelengths (266 nm and 355 nm), or others, to identify particles of biological origin, which are those used by the BAWS and FLAPS fluorescence detectors, respectively. Preferably, this fluorescence stage incorporates a pulsed UV laser that can be triggered on demand by a timing signal derived from the tracking/sizing region. Both 266 and 355 nm lasers fire with a short delay (~10–20 μs or less) in response to the randomly distributed trigger signals at a high average rate (>$10^4$ Hz) with moderate energy requirements, ~10 μJ per pulse or less. CW-diode-pumped Q-switched Nd:YAG lasers or, better, Nd:YVO4 lasers can meet these requirements. It is notable that the two main interference particles, not composed of biological material, that are known to fluoresce are diesel soot and mineral aerosols. Diesel soot is expected to be smaller than 1 micron in diameter and mineral aerosols are irregularly shaped. Thus the system is capable of selecting out possible interfering particles prior to detection of fluorescence.

Figure 22:
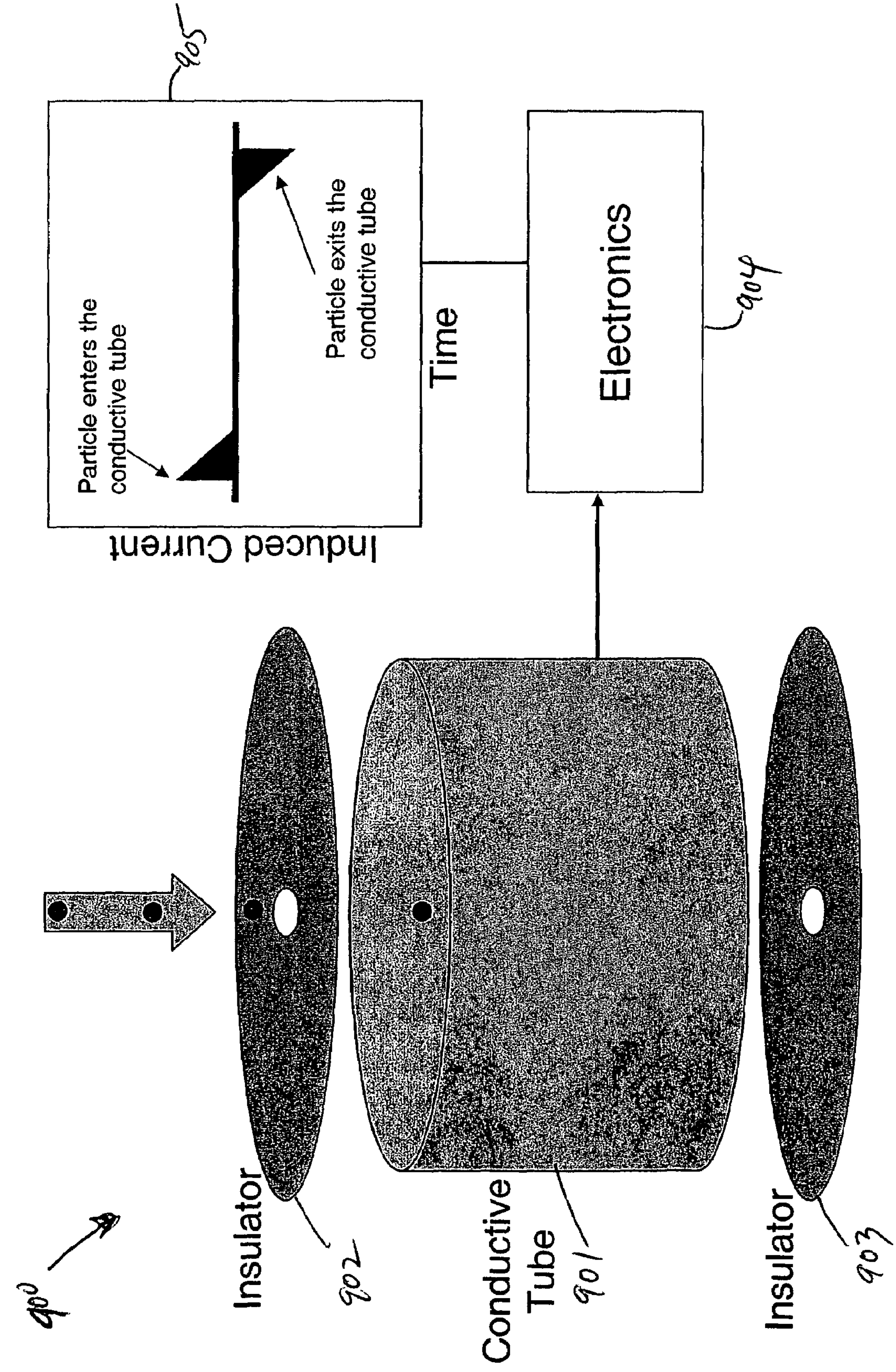
FIG. 22 is a schematic view of an exemplary embodiment of a charge level detection module.

As shown in FIG. 10, a charge level detection module 707 is also provided for determining the amount of charge of a particle passing therethrough. While shown as the last qualification stage immediately preceding entering the ablation chamber of the mass spectrometer 708, particle charge level determination is not limited to that position in the serial arrangement. Charge level determination may be performed such as prior to the particle shape determination shown at 705 upon exiting the tracking stage. In any case, this determination operates to pre-qualify particles by their chemical composition since the chemical makeup of a particle governs how much charge it will have. For example, particles released by highly energetic methods (e.g. explosives) have large amounts of surface charge, and "weaponized" particles, also have high amounts of surface charge. FIG. 22 shows an exemplary embodiment of a charge level detector, generally indicated at 900, having a conductive tube 901 bordered at either end by a first insulator plate 902 and a second insulator plate 903. As a charged particle passes through the first insulator plate 902 and enters the conductive tube 901 a current is induced, the magnitude of which is in proportion to the amount of charge on the particle and measured by electronics 904 connected to the tube. As shown by the graph 905 plotting induced current with respect to time and representing current detection by the electronics, the induced current rapidly dissipates, and as the particle exits the tube, another equal current is induced but of opposite polarity. Thus the use of the conductive tube provides two opportunities to measure the charge on the particle, and the transit time through the tube, which also serves to confirm the velocity and size of the particle.

At this point in the system 700, at least one (and preferably all) of the size, shape (including symmetry), and chemical nature of each particle on a trajectory entering the Mass Spectrometer (MS) region 708 is known. Each particle that has passed all of the required pre-selection tests, is desorbed and ionized by a high power (~600 μJ) laser, such as a pulsed 266 nm Nd:YAG, and the resulting ions are analyzed by single particle mass spectrometry as previously discussed. In this manner, the ablation laser cycling of the single particle mass spectrometry is reduced due to limited activation for only the qualifying aerosol particles, and thereby also provide the improvement in false alarm rate. Based upon the available lasers, mass spectrometry detectors (e.g. micro-channel plates), and data acquisition hardware, this region of the instrument can process $10^3$ particles per second, and can provide, on average, a 1 ms detector recharge and data processing window between each particle.

The mass spectral signature is sent to a pre-trained neural network algorithm for analysis to determine the identity of each particle. In the exemplary embodiment where a bipolar single particle mass spectrometer is utilized, both positive and negative test spectra may be used in the identity determination previously discussed. In particular, the identity determination in this case can include comparing the corresponding positive and negative test spectrum of the particle to spectra of the same respective polarity in a database of predetermined positive and negative spectra for known particle types to obtain a set of substantially matching spectra. Then, a best matching one of the known particle types having both a substantially matching positive spectrum and a substantially matching negative spectrum associated with the known particle.

Figure 21:
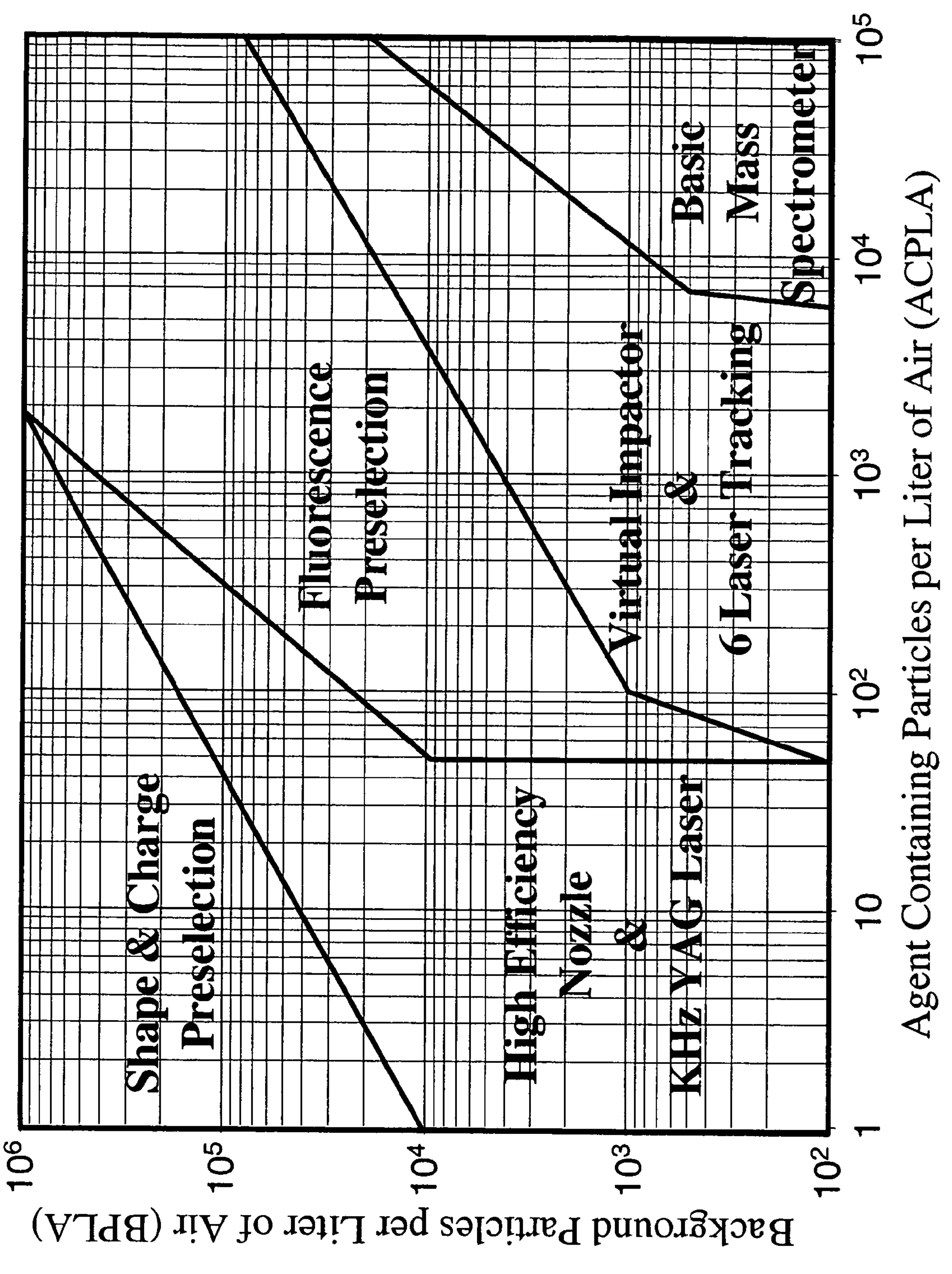
FIG. 21 is a graph illustrating the performance capability of the present invention to detect a single agent-containing particle per liter of air (ACPLA) in as high as $10^6$ background particles.

The particle beam characterization, scattering pattern recognition, fluorescence and mass spectra are all preferably controlled and analyzed by dedicated computer systems such as Field Programmable Gate Arrays (FPGAs). These computer platforms operate at high kilohertz rates and enable the system to individually analyze up to several thousand particles per second (duty cycle of ~$10^3$ Hz), and thereby detect a single Agent-Containing Particle per Liter of Air (ACPLA) in as high as $10^6$ background particles, as shown in FIG. 21.

When the presence of threat agents is detected, an alarm is triggered. However, the determination that a biological or chemical attack is taking place should not necessarily be made on the basis of a single particle determined to be a chemical or biological agent due to the fact that essentially all analytical instruments are subject to arriving at false positive results. An alternative method of determining that an attack is taking place can require that multiple particles be identified as being biological agents. For example, it may be determined that given the background particles being observed by the mass spectrometer, one particle per minute on average would be indistinguishable from a biological agent. The precise number of positive detections required to sound an alarm would depend on the minimum confidence level required. The Poisson distribution provides an estimate of the probability that a given number of randomly distributed events occurring at an average rate will occur at in any given time period. One can determine the average rate of false positives per minute and use the Poisson distribution to find the minimum number of positive detections that would occur with an acceptably small probability in a given time period. This number is, then, the threshold for the number of detections that would need to be made within that time period for an alarm to be sounded.

Additionally, not all particles absorb light at all wavelengths equally, and certain molecules of high analytical value, particularly proteins, are fragile when directly irradiated by laser light. An alternative method for collecting mass spectra of high analytical content involves the addition of a chemical, called a matrix, to the particle that absorbs the laser light directly. Thus, when the laser irradiates the particle, the matrix absorbs the light and transmits its excitation energy to the particle. This causes particles that would otherwise not absorb light well to produce mass spectra of high analytical content at far lower laser fluences than would otherwise work, and can also gently desorb fragile molecules of high analytical value without the loss of their structural information. The matrix can be introduced in a variety of ways. It can be condensed onto the particles as they are introduced into the instrument or after they have passed through the prescreening areas. Particles of matrix can be produced by inkjet to either combine with the analyte particle or be desorbed and ionized near the particle by the D/I laser to ionize the analyte particle secondarily.

In this manner, the system may be used for operations in highly polluted environments such as urban, industrial, and battlefield settings. As an increasing number of particles are analyzed and identified, they are plotted in a pie chart depicting the percentage of each particle type that was identified, which is updated in real-time. When the presence of threat agents is detected, an alarm is triggered; this can be used, for example, to initiate emergency control procedures.

It is notable that the present invention may be used for, but is not limited to, sample identification; plume chemistry analysis; chemical and bio-warfare agent detection; air and water supply integrity, such as at office buildings, ports of entry, transportation systems, public events, etc.; climate forcing studies; meteorology; forensics; inhaler drug delivery systems; cigarette smoke analysis; academic aerosol research; medical diagnostics, including rapdi medical screening for human and animal pathogen identification, lung ejecta, sputum analysis, whole blood analysis, etc.; process control; and combinatorial chemistry, among others. Furthermore, the system is preferably a small, rugged, field portable (e.g. weighing less than 100 pounds) unit, requiring only electricity for operation, and easily configurable into a regionally/global detection network.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

We claim:

1. A method of identifying individual aerosol particles comprising:

collimating sample aerosol particles into a particle beam;

tracking the collimated particles of the particle beam;

screening the tracked particles to determine which ones qualify for mass spectrometric analysis by satisfying predetermined qualification criteria;

desorbing/ionizing the qualifying particles in a bipolar mass spectrometer to produce positive and negative test spectra for each qualifying particle; and determining the identity of each desorbed/ionized particle by comparing the corresponding positive and negative test spectrum to spectra of the same respective polarity in a database of predetermined positive and negative spectra for known particle types to obtain a set of substantially matching spectra; and determining a best matching one of the known particle types having both a substantially matching positive spectrum and a substantially matching negative spectrum associated therewith from the set of substantially matching spectra.

2. The method of claim 1, further comprising pre-concentrating particles of a predetermined particle size range for collimation.

3. The method of claim 2, wherein a virtual impactor is used to pre-concentrate the particles in the predetermined particle size range.

4. The method of claim 1, wherein the sample aerosol particles are collimated into the particle beam by at least one of aerodynamically focusing and acoustically focusing the particles onto a central axis of the particle beam.

5. The method of claim 4, wherein the sample aerosol particles are collimated into the particle beam by both aerodynamically and acoustically focusing the particles onto the central axis of the particle beam.

6. The method of claim 1, wherein the collimated particles are tracked by determining the velocities thereof.

7. The method of claim 6, wherein the collimated particles are tracked by further determining the trajectories thereof.

8. The method of claim 7, wherein the collimated particles are tracked using an optical detector comprising at least two photo-sensors serially arranged along a flow path of the particle beam and capable of optically detecting particles passing thereby, said optical detector adapted to determine particle velocities from the time of flight between the photo-sensors and particle trajectories from the differences in detection response between the photo-sensors.

9. The method of claim 6, wherein the screening of the tracked particles comprises determining the size of a particle from a particle's velocity determination, and the qualification criteria includes having a particle size within a predetermined particle size range.

10. The method of claim 1, wherein the screening of the tracked particles comprises determining the symmetry of a particle, and the qualification criteria includes having a predetermined particle symmetry or asymmetry.

11. The method of claim 10, wherein particle symmetry is determined using a continuous wave laser and an opposing pair of photomultiplier (PMT) tubes, and from the scattered light detected by the opposing pair of photomultiplier (PMT) tubes when a particle crosses the continuous wave laser.

12. The method of claim 1, wherein the screening of the tracked particles comprises determining the shape of a particle, and the qualification criteria includes having a predetermined particle shape.

13. The method of claim 12, wherein the shape of a particle is determined using a multi-channel, spatially-resolved photo-sensor array adapted to measure at least two-dimensional optical scattering patterns produced from light scattered by a passing particle.

14. The method of claim 13, wherein the at least two-dimensional optical scattering patterns are produced from the scattered light within a $4\pi$ solid angle.

15. The method of claim 1, wherein the screening of the tracked particles comprises determining whether an individual particle is a biological particle, and the qualification criteria includes exhibiting fluorescence when exposed to radiation in a predetermined wavelength range.

16. The method of claim 1, wherein the screening of the tracked particles comprises determining the amount of charge on a particle, and the qualification criteria includes having a predetermined amount of charge indicative of a chemical composition of interest.

17. The method of claim 1, wherein the screening of the tracked particles comprises at least one of:

determining the size of an individual particle, with the qualification criteria including having a particle size within a predetermined particle size range;

determining the symmetry of an individual particle, with the qualification criteria including having a predetermined particle symmetry or asymmetry;

determining the shape of an individual particle, with the qualification criteria including having a predetermined particle shape;

determining whether an individual particle is a biological particle, with the qualification criteria including exhibiting fluorescence when exposed to radiation in a predetermined wavelength range; and determining the amount of charge on a particle, and the qualification criteria includes having a predetermined amount of charge indicative of a chemical composition of interest.

18. The method of claim 1, wherein the comparison of each test spectrum to spectra of the same respective polarity in the database produces a similarity score for each predetermined spectrum, with the set of substantially matching spectra based on a predetermined similarity score threshold.

19. The method as in claim 18, wherein the best matching one of the known particle types has associated therewith, for at least one of the substantially matching positive and negative spectra, the highest order similarity score of all substantially matching spectra of the same respective polarity.

20. The method as in claim 19, wherein the best matching one of the known particle types has associated therewith a substantially matching positive spectrum with the highest order similarity score of all substantially matching positive spectra.

21. The method as in claim 19, wherein the best matching one of the known particle types has associated therewith a substantially matching negative spectrum with the highest order similarity score of all substantially matching negative spectra.

22. The method as in claim 18, wherein the comparison of each test spectrum to the database includes converting each test spectrum into a corresponding test spectrum vector, and vector multiplying the test spectrum vector with a transpose of a predetermined spectrum vector of the same respective polarity to calculate the similarity score.

23. A method of identifying individual aerosol particles comprising:

pre-concentrating a predetermined particle size range of sample aerosol particles;

collimating the pre-concentrated particles into a particle beam by at least one of aerodynamically focusing and acoustically focusing the particles onto a central axis of the particle beam;

tracking the collimated particles using an optic detector comprising at least two photo-sensors serially arranged along a flow path of the particle beam and capable of optically detecting particles passing thereby, said optical detector adapted to determine particle velocities from the time of flight between the photo-sensors and particle trajectories from the differences in detection response between the photo-sensors;

screening the tracked particles to determine which ones qualify for mass spectrometric analysis by satisfying predetermined qualification criteria, said screening comprising at least one of: determining the size of an individual particle, with the qualification criteria including having a particle size within a predetermined particle size range; determining the symmetry of an individual particle, with the qualification criteria including having a predetermined particle symmetry or asymmetry; determining the shape of an individual particle, with the qualification criteria including having a predetermined particle shape; determining whether an individual particle is a biological particle, with the qualification criteria including exhibiting fluorescence when exposed to radiation in a predetermined wavelength range, and determining the amount of charge on a particle, with the qualification criteria including having a predetermined amount of charge indicative of a chemical composition of interest;

desorbing/ionizing the qualifying particles in a bipolar mass spectrometer to produce positive and negative test spectra for each qualifying particle; and determining the identity of each desorbed/ionized particle by comparing the corresponding positive and negative test spectrum to spectra of the same respective polarity in a database of predetermined positive and negative spectra for known particle types to obtain a set of substantially matching spectra; and determining a best matching one of the known particle types having both a substantially matching positive spectrum and a substantially matching negative spectrum associated therewith from the set of substantially matching spectra.

24. A system for determining the identities of individual aerosol particles comprising:

a collimating module adapted to produce a particle beam from sample aerosol particles;

a particle tracking module adapted to track the collimated particles of the particle beam;

screening means for determining which ones of the tracked particles qualify for mass spectrometric analysis by satisfying predetermined qualification criteria;

a single particle bipolar mass spectrometer having an ablation laser for desorbing/ionizing the qualifying particles to produce positive and negative test spectra for each qualifying particle; and analyzing means for determining the identity of each desorbed/ionized particle, wherein the analyzing means comprises: a data storage medium; a database of predetermined mass spectra for known particle types stored on the data storage medium; and a data processor adapted to determine the identity of each desorbed/ionized particle by:

comparing the corresponding positive and negative test spectrum of the particle to spectra of the same respective polarity in a database of predetermined positive and negative spectra for known particle types to obtain a set of substantially matching spectra; and determining a best matching one of the known particle types having both a substantially matching positive spectrum and a substantially matching negative spectrum associated therewith from the set of substantially matching spectra.

25. The system of claim 24, further comprising a pre-concentrating module adapted to pre-concentrate a predetermined particle size range for collimation.

26. The system of claim 25, wherein the pre-concentrating module is a virtual impactor.

27. The system of claim 24, wherein the collimating module comprises at least one of an aerodynamic focusing module having a converging nozzle and an acoustic focusing module, with each module adapted to focus the particles onto a central axis of the particle beam.

28. The system of claim 27, wherein the collimating module comprises both the aerodynamic focusing module and the acoustic focusing module.

29. The system of claim 24, wherein the particle tracking module is adapted to determine the velocities of the collimated particles.

30. The system of claim 29, wherein the particle tracking module is adapted to further determine the trajectories of the collimated particles.

31. The system of claim 30, wherein the particle tracking module comprises an optical detector comprising at least two photo-sensors serially arranged along a flow path of the particle beam with each capable of optically detecting particles passing thereby, said tracking module adapted to determine particle velocities from the time of flight between the photo-sensors and particle trajectories from the difference in detection response between the photo-sensors.

32. The system of claim 29, wherein the screening means includes means for determining the size of a particle from the particle velocity determined by the particle tracking module, and an associated qualification criteria includes having a particle size within a predetermined particle size range.

33. The system of claim 24, wherein the screening means includes means for determining the symmetry of a particle, and an associated qualification criteria includes having a predetermined particle symmetry or asymmetry.

34. The system of claim 33, wherein the symmetry screening module comprises a continuous wave laser and an opposing pair of photomultiplier (PMT) tubes, and is adapted to determine particle symmetry from the scattered light detected by the opposing pair of photomultiplier (PMT) tubes when a particle crosses the continuous wave laser.

35. The system of claim 24, wherein the screening means includes means for determining the shape of a particle, and an associated qualification criteria includes having a predetermined particle shape.

36. The system of claim 35, wherein the means for determining the shape of a particles comprises a multi-channel, spatially-resolved photosensor array adapted to measure at least two-dimensional optical scattering patterns produced from light scattered by a passing particle.

37. The system of claim 36, wherein the at least two-dimensional optical scattering patterns are produced from the scattered light within a $4\pi$ solid angle.

38. The system of claim 24, wherein the screening means includes means for determining whether a particle is a biological particle, and an associated qualification criteria includes exhibiting fluorescence when exposed to a radiation in a predetermined wavelength range.

39. The system of claim 24, wherein the screening means includes means for determining the amount of charge on a particle, and the qualification criteria includes having a predetermined amount of charge indicative of a chemical composition of interest.

40. The system of claim 24, wherein the screening means comprises at least one of:

means for determining a particle size of an individual particle from its velocity determination, with an associated qualification criteria including having a particle size within a predetermined particle size range;

means for determining the symmetry of an individual particle, with an associated qualification criteria including having a predetermined particle symmetry or asymmetry;

means for determining the shape of an individual particle, with an associated qualification criteria including having a predetermined particle shape;

means for determining whether the individual particle is a biological particle, with an associated qualification criteria including exhibiting fluorescence when exposed to radiation in a predetermined wavelength range; and means for determining the amount of charge on a particle, with the qualification criteria including having a predetermined amount of charge indicative of a chemical composition of interest.

41. The system of claim 24, wherein the analyzing means comprises: a data storage medium; a database of predetermined mass spectra for known particle types stored on the data storage medium; and a data processor adapted to determine the identity of each desorbed/ionized particle by comparing the corresponding test spectrum to the predetermined mass spectra for the known particle types.

42. The system of claim 24, wherein upon comparing each test spectrum to spectra of the same respective polarity in the database, the data processor produces a similarity score for each predetermined spectrum, with the set of substantially matching spectra based on a predetermined similarity score threshold.

43. The system of claim 42, wherein the best matching one of the known particle types has associated therewith, for at least one of the substantially matching positive and negative spectra, the highest order similarity score of all substantially matching spectra of the same respective polarity.

44. The system of claim 43, wherein the best matching one of the known particle types has associated therewith a substantially matching positive spectrum with the highest order similarity score of all substantially matching positive spectra.

45. The system of claim 43, wherein the best matching one of the known particle types has associated therewith a substantially matching negative spectrum with the highest order similarity score of all substantially matching negative spectra.

46. The system of claim 42, wherein the comparison of each test spectrum to the database includes converting each test spectrum into a corresponding test spectrum vector, and vector multiplying the test spectrum vector with a transpose of a predetermined spectrum vector of the same respective polarity to calculate the similarity score.

47. A system for identifying individual aerosol particles comprising:

a particle concentrator module for pre-concentrating a predetermined particle size range of sample aerosol particles;

a collimating module having at least one of an aerodynamic focusing component and an acoustic focusing component, for producing a collimated particle beam from sample aerosol particles by focusing the particles onto a central axis of the particle beam;

a particle tracking module having an optic detector comprising at least two photo-sensors serially arranged along a flow path of the particle beam and capable of optically detecting particles passing thereby, said optical detector adapted to determine particle velocities from the time of flight between the photo-sensors and particle trajectories from the differences in detection response between the photo-sensors;

screening means for determining which ones of the tracked particles qualify for mass spectrometric analysis by satisfying predetermined qualification criteria, the screening means comprising at least one of: means for determining the size of an individual particle, with the qualification criteria including having a particle size within a predetermined particle size range; means for determining the symmetry of an individual particle, with the qualification criteria including having a predetermined particle symmetry or asymmetry; means for determining the shape of an individual particle, with the qualification criteria including having a predetermined particle shape; means for determining whether an individual particle is a biological particle, with the qualification criteria including exhibiting fluorescence when exposed to radiation in a predetermined wavelength range, and means for determining the amount of charge on a particle, with the qualification criteria including having a predetermined amount of charge indicative of a chemical composition of interest;

a single particle bipolar mass spectrometer having an ablation laser for desorbing/ionizing the qualifying particles to produce positive and negative test spectra for each qualifying particle; and analyzing means for determining the identity of each desorbed/ionized particle by comparing the corresponding positive and negative test spectrum to spectra of the same respective polarity in a database of predetermined positive and negative spectra for known particle types to obtain a set of substantially matching spectra; and determining a best matching one of the known particle types having both a substantially matching positive spectrum and a substantially matching negative spectrum associated therewith from the set of substantially matching spectra.

* * * * *